United States Patent [19]
Martens et al.

[11] Patent Number: 6,157,677
[45] Date of Patent: Dec. 5, 2000

[54] METHOD AND APPARATUS FOR COORDINATION OF MOTION DETERMINATION OVER MULTIPLE FRAMES

[75] Inventors: Harald Aagaard Martens, Munich; Jan Otto Reberg, Unterföhring, both of Germany

[73] Assignee: IDT International Digital Technologies Deutschland GmbH, Ismaning, Germany

[21] Appl. No.: 08/930,340

[22] PCT Filed: Mar. 22, 1996

[86] PCT No.: PCT/EP96/01272

§ 371 Date: Nov. 21, 1997

§ 102(e) Date: Nov. 21, 1997

[87] PCT Pub. No.: WO96/29679

PCT Pub. Date: Sep. 26, 1996

[30] Foreign Application Priority Data

Mar. 22, 1995 [EP] European Pat. Off. .............. 95104228

[51] Int. Cl.[7] ...................................................... H04N 7/12
[52] U.S. Cl. .................. 375/240.16; 348/416.1; 348/699
[58] Field of Search ................... 375/240.16; 348/407.1, 348/413.1, 416.1, 699, 700; 382/236, 238, 239; 381/111; 358/261.2

[56] References Cited

U.S. PATENT DOCUMENTS 4,717,956  1/1988  Moorhead et al. .................. 348/409.1
5,392,072  2/1995  Rodriguez et al. .................. 348/405.1
5,983,251  11/1999  Martens et al. .......................... 708/203

OTHER PUBLICATIONS

Soatto et al, "Dynamic Visual Motion Estimation From Subspace Constraints", IEEE, 1994.
Davis et al, "Equivalence of Subpixel Motion Estimators Based on Optical Flow and Block Matching", IEEE, 1995.

*Primary Examiner*—Vu Le
*Attorney, Agent, or Firm*—Darby & Darby

[57] ABSTRACT

The present invention concerns improved motion estimation in signal records. A method for estimating motion between one reference image and each frame in a sequence of frames, each frame consisting of a plurality of samples of an input signal comprises the steps of: transforming the estimated motion fields into a motion matrix, wherein each row corresponds to one frame, and each row contains each component of motion vector for each element of the reference image; performing a Principal Component Analysis of the motion matrix, thereby obtaining a motion score matrix consisting of a plurality of column vectors called motion score vectors and a motion loading matrix consisting of a plurality of row vectors called motion loading vectors, such that each motion score vector corresponds to one element for each frame, such that each element of each motion loading vector corresponds to one element of the reference image, such that one column of said motion score matrix and one motion loading vector together constitute a factor, and such that the number of factors is lower than or equal to the number of said frames; wherein the results from the Principal Component Analysis on the motion matrix are used to influence further estimation of motion from the reference image to one or more of the frames.

43 Claims, 6 Drawing Sheets

METHOD AND APPARATUS FOR COORDINATION OF MOTION DETERMINATION OVER MULTIPLE FRAMES

RELATED APPLICATIONS

The application is related to the following applications assigned to the same applicant as the present invention and filed on even date herewith, the disclosure of which is hereby incorporated by reference:

Method and apparatus for multi-frame based segmentation of date streams, U.S. Ser. No. 08/930,341.

Method and apparatus for depth modelling and providing depth information of moving objects U.S. Ser. No. 08/930,339.

FIELD OF THE INVENTION

This invention relates generally to the parameterization of each of a set of large, related data records. More specifically, it concerns improved motion estimation in sets of related signal records, e.g. video frames.

BACKGROUND OF THE INVENTION

Within video modelling and compression, motion estimation and motion compensation is important. Without it moving objects and other motions are difficult to describe efficiently in applications like video compression and interactive video games. Singh Ajit (1991, Optical Flow Computation. IEEE Computer Society Press) describes general methods for motion estimation.

Motion estimation is usually done from one frame to another frame, say, from a frame m to a frame n, for whose intensities we use the term $I_m$ and $I_n$.

When good statistical precision and accuracy of the motion estimation is required, it is important to use all the available information efficiently in the motion estimation. This means that if moving physical objects or phenomena are repeatedly observed in several frames, increased precision and accuracy may be attained if the motion estimation is coordinated between these repeated observation frames.

However, motion estimation is normally a computationally demanding operation, in particular when full motion fields, with one vertical and horizontal motion parameter for each individual pixel in $I_m$ or $I_n$ are to be determined.

Motion estimation can also be very memory demanding. Any simultaneous motion estimation for many frames is bound to be exceptionally demanding.

On the other hand, full motion field estimation on the basis of only two individual frames is underdetermined: For many pixels, an equally good fit can be found with a number of different motion estimates, although only one of these corresponds to the original physical movement of the objects imaged.

When physical objects can be observed to move systematically over several frames, their motions are generally such that if their true two-dimensional (2D) motion fields had been known, these would have systematic similarities from frame to frame. Due to these systematic similarities, the motion fields of a number of related frames could theoretically be modelled with relatively few independent parameters. This modelling would in turn have led to very efficient compression and editing techniques for video.

However, in practice, the true motion fields cannot be determined from empirical data. First of all there will be more or less random errors in the obtained motion fields due to more or less random noise contributions in the raw data. Worse, due to the underdetermined nature of full motion estimation the probability of finding the 'true' motion field is low. A different set of spurious false motion estimates may be chosen for each frame.

Thus, existing methods and apparatuses for determining motion for a number of frames, based on individual frame pairs, have several drawbacks:

1. The lack of coordination in the motion estimation for the different frames makes it difficult to model the set of motion estimation fields efficiently and hence attain good compression of these without loss of fidelity, and good editability control.

2. The motion estimates are unnecessarily imprecise due to sensitivity to random noise in the images, since the methods do not employ the stabilizing fact that the same non-random objects or phenomena are seen in several frames.

3. The motion estimates are unnecessarily inaccurate due to the underdeterminate nature of many motion estimation problems. The imprecise, inaccurate results represent an over-parameterization that may fit the individual pairs of frames well, but have bad interpolation/extrapolation properties, and do not give good approximations of the true, but unknown physical motions.

4. Attempts at coordinating the motion estimation by treating many frames in computer memory at the same time are computationally and memorywise very demanding.

OBJECTS OF THE INVENTION

It is therefore an object of the present invention to provide a technique for coordinating the motion estimation for a set of many frames, so that the set of motion estimates can be modelled effectively to give good compression and good editability control.

Another object of the invention is to coordinate the motion estimation for a set of many frames in order to obtain higher precision and accuracy in the motion estimation for each of them, by discriminating between on one hand systematic motion patterns shared by several frames, and on the other hand apparent motion patterns that are unique for each frame and that are possibly due to random noise effects and estimation ambiguity.

Yet another object is to attain more precise and accurate modelling of the true, unknown causal motion patterns, by probabilistically biased restriction of the motion estimation for each frame towards to its coordination with that of the other frames.

It is yet another object of the invention to implement the technique so that it does not require very much processing power or computer memory, yet allows coordination of a high number of related frames.

It is yet an object of the invention to provide a method that can employ both non-linear and linear modelling methods for the probabilistical biased restriction.

It is also an object to provide a technique that employs multiframe modelling of other data than motion data in order to improve the estimation of motion itself.

Finally, it is an object of the invention to provide a method that employs motion estimation, -modelling and -compensation to make other multiframe data than motion data more suitable for bilinear modelling.

NOTATION AND DEFINITIONS

In the following, the symbol '*' is used for multiplication when needed, (except in FIG. 6, where it symbolizes iteration). The symbol 'x' is used for representing dimensions of a matrix (e.g. Size=nRows×nColumns). Boldface uppercase letters are used for representing data matrices, and boldface lowercase letters for data vectors. The terms Principal Component Analysis, PCA, Bilinear Modelling and BLM are used synonymously in the following, to represent spatiotemporal subspace modelling.

SUMMARY OF THE INVENTION

Coordination of motion estimation over several frames are attained by approximating the motion estimates by bilinear modelling. The bilinear model represents a subspace approximation of the motion fields of several frames. The parameters of the bilinear model—loading vectors, score vectors and residuals—are estimated by principal component analysis or some related method. The bilinear models are defined relative to a reference image.

The motion estimation for a given frame is simplified and stabilized by the use of preliminary bilinear motion parameter values established prior to this motion estimation. These preliminar bilinear parameter values are used both for generating a relevant start hypothesis for the motion estimation and for conducting the motion estimation for the frame towards the corresponding motion patterns found for other frames previously.

The bilinear motion model in the end summarizes the common motion patterns for objects in a set of related frames.

Several different control structures for the multi-frame bilinear motion modelling are described.

Special bilinear parameter estimation methods are described, involving spatial and temporal smooting as well as reweighting and optimal scaling.

The bilinear motion modelling is combined with bilinear modelling of motion compensated intensity changes in two different ways, for enhanced motion estimation as well as for flexible pattern recognition.

BASIC IDEA

Figure 1:
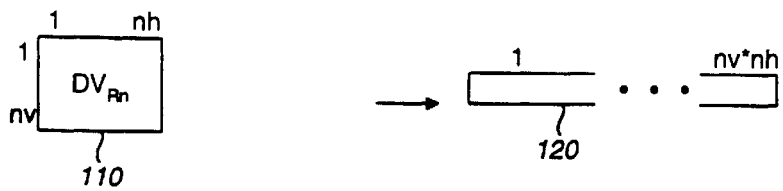
FIG. 1 illustrates how a frame-size (with nv×nh pixels) motion field in one motion direction (here: $DV_{Rn}$ for Delta Vertical address, i.e. vertical motion, for each pixel from reference image R to image n) can be strung out as a one-dimensional vector with nv*nh elements.

Given the importance in e.g. video coding, of establishing valid and reliable motion fields for each frame, as well as valid and/or reliable motion representation for a whole sequence, the present invention enables the accumulation and use of motion information from many frames, thereby reducing estimation ambiguity, occlusion problems and noise sensitivity, even with limited computer resources.

The basic idea is to develop and maintain a common mathematical model description of whatever systematic motion patterns are found for a set of pixels in a set of frames, and use this for the improvement of the motion estimate for each individual frame. The mathematical model that summarizes the systematic motion patterns can be of different kinds. On one hand the model must have sufficiently many independent parameters to describe the required motions adequately. On the other hand it should be sufficiently simple to statistical restriction of the underdetermined, noise-sensitive motion estimation problem. Hence, the number of independent parameters of the model should be dynamically, depending on the need for modelling flexibility (avoiding underfitting) and the need for noise rejection (avoiding overfitting).

The parameters in mathematical models are used for communicating common systematic variation patterns between frames in order to enhance the motion estimation for each frame. These model parameters are in turn estimated by suitable methods in order to accumulate and combine systematic motion information for the set of frames.

One kind of applicable mathematical modelling type is to approximate the common change patterns by a multidimensional additive model, which can also be seen as a subspace model or a 'bilinear model'. Central in the present invention is that this subspace model may contain more than one dimension. Central is also that the definition of the subspace model is data driven instead of theory driven—that is, it is determined—at least partially—from empirical data, not from mathematical functions such as sines and cosines.

The method will be explained with regards to an application for 2D images: the parameterization of motion in video coding for compression or editing control. It is also applicable for 1D data structures (time warping in sound analysis, line camera motion estimation in process control) and for 3D data structures (e.g. MRI scans of human brains).

Motion Data Representation for Multi-frame Modelling

The motion field in video has a Vertical component DV and a horizontal component DH. They will collectively be referred to as optical flow field or motion field DA ('Delta Address').

In some video coding methods, several signal records (frames) are related to one common 'reference image'. One example of this is the IDLE codec type, as described in patent application WO95/08240, Method and apparatus for Data Analysis, where the motion, intensity changes and other modelled change information for a number of (consecutive) frames is directly or indirectly represented relative to a common 'extended Reference image model' (symbolized by index R), for a given segment of pixels (a spatial 'holon') in a given sequence of related frames n=1, 2, . . . . An IDLE type decoder using reference image model is described in WO95/134172 Apparatus and method for decoding video images.

Hence, the motion field subscripted $DA_{Rn}$ represents how the individual pels in the Reference image model are to be moved in the vertical and horizontal directions in order to approximate the input frame n.

In the present invention each motion direction may be modelled separately.

FIG. 1 shows how the vertical motion field $DV_{Rn}$ with nv×nh pets can be strung out as a row vector with nv*nh elements. Motion fields for several frames represents several such vectors of the same size, which can then be modelled together.

Figure 2:
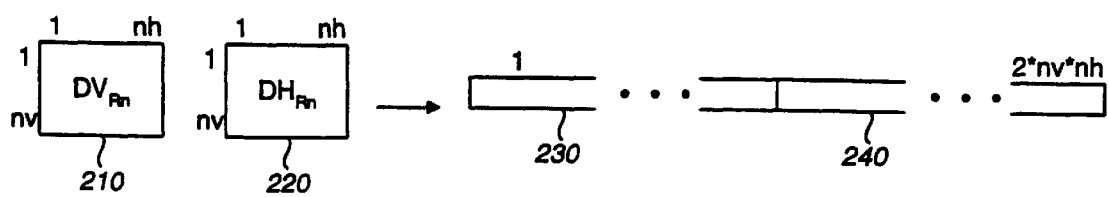
FIG. 2 illustrates how two frame-size (nv×nh pixels each) motion fields $DA_{Rn}=[DV_{Rn}$ and $DH_{Rn}]$ for the Vertical and Horizonal directions) can be strung out together as a one-dimensional vector with 2 nv*nh elements, for the case when both motion directions are modelled simultaneously.

In the present invention the different motion field directions can also be modelled jointly. FIG. 2 shows how both the vertical and horizontal motion fields can be stored in one row vector, now with 2*nv*nh elements. Again, such vectors for several frames will have the same sizes, and can thus be modelled together.

Sub-space Factor Modelling of Motion Data

In the present invention the estimated motion fields for a set of frames at a given point in time are modelled together in a sequence model, and this model is used for stabilizing the motion estimation for the individual frames, whereupon these newly motion estimates are used for improving the sequence model, etc.

A preferred implementation of modelling method is the use of manifolds with limited number of independently estimated parameters, such as a neural net with few hidden nodes, estimated by e.g. back propagation (see e.g. Widrow, B. and Lehr, M. A. (1990) 30 years of Adaptive Neural Networks: Perceptron, Madaline and Backpropagation. Proceedings for the IEEE, vol 78,9, pp 1415–1442.). Among the manifold types, the linear ones, which can be seen as spaces and subspaces, are preferable, due to computation speed, flexible choice of implementation, well understood theoretical properties and easily interpreted results. This is described in detail in Martens, H. and Naes, T. (1989) Multivariate Calibration. J.Wiley & Sons Ltd, Chichester UK.

Improved Sub-space Modelling by the Use of a Common Reference Position

In order for the motion fields for several frames to be modelled efficiently together, they should preferably be represented in a common reference position. The use of this common reference position is also important in order to allow efficient modelling of intensity changes and other properties of the elements in the frames. These properties may have to be motion compensated in order to be moved back to this reference position for modelling. A reference image $I_R$ may be chosen or constructed from the set of related frames $I_n$. This reference image could e.g. be the first, middle or last image in the sequence n=1,2, . . . ,N, or a combination of information from several frames. Except at the very beginning of the encoding process for a video sequence, there are usually two or more segments (holons) being modelled more or less seperately and therefore each having its own reference image information. (More details on segmentation into holons are given in the patent application "Method and apparatus for multi-frame based segmentation of data streams", mentioned before, and more details on depth estimation on multiple frames are given in the application "Method and apparatus for depth modelling and providing depth information of moving objects", mentioned before. The reference image information for the different holons may be stored separately in several reference images $I_R$(holon), holon=1,2, . . . , or stored jointly in a collage reference image $I_R$.

The representation of the spatial parameters in one common reference position has three advantages, relative to motion estimation:

1) The motion estimates become more robust against input data noise and against incidental motion estimation errors, and hence will have more reliability and validity.

2) The motion estimates from the different related frames may be more easily modelled mathematically and hence more easy to compress and/or edit (for video coding) and/or to control later (for video games and virtual reality).

3) The motion estimation process may be faster, since the information from various images serve as effective statistical constraints.

Algebraic Description of the Sub-space Modelling

Some necessary algebraic tools will first be described.

The purpose of the subspace modelling is to attain a somewhat flexible, but sufficiently restrictive model of the systematic covariations in a set of motion field estimates. The subspace description can be formulated as a bilinear factor model.

More details on the bilinear modelling is given in H. Martens & Naes,T. (1989) Multivariate Calibration. J.Wiley & Sons Ltd Chichester UK. Here is a summary:

The motion field vectors from a number of frames n=1,2, . . . nFrames may be stromes in a matrix and subjected to multivibrate modelling in order to find the compact yet flexible approximation to enhance the motion estimation.

Figure 3:
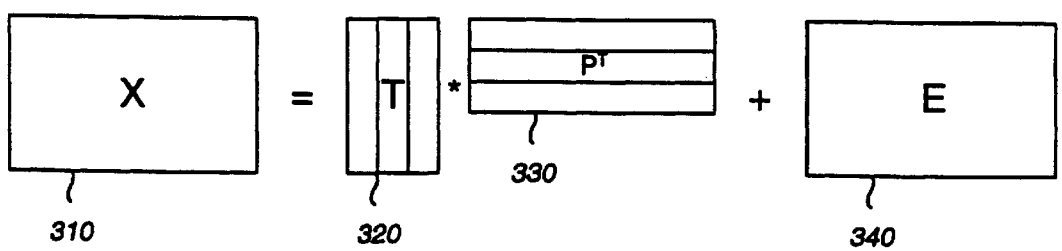
FIG. 3 is an illustration of how a matrix X can be modelled by the bilinear product of two lower-rank matrices $T*P^T$ plus a residual matrix E.

Each row in matrix X in FIG. 3 may be the motion field vector of a frame, in one or more motion directions. If the data for all the frames are represented at the same reference position, then each column in X may be seen as observed properties of its corresponding 'reference position pixel' pel=1,2, . . . ,nPels.

These observed properties, showing for instance the stron out motion data defining ho the intensity value of the reference pixels $I_R$ should be moved in order to reconstruct the realted frames $I_n$,n=1,2, . . . ,nFrames, may be approximated by a bilinear model (BLM): Matrix X can be written as a sum of a low number of more or less common change phenomena ('latent variables', factors, principal components) f=1,2, . . . , nFactors, plus residuals:

$$X = X_1 + X_2 + \ldots + X_{nFactors} + E$$

where

X is the data to be modelled,—it has one row for each frame modelled and one column for each pixel variable to be modelled simultaneously (e.g. one horizontal and one vertical motion element for each pixel.)

$X_1, X_2, \ldots, X_4, \ldots, X_{nFactors}$ are the individual factor contributions spanning the major systematic covariations patterns in X,—same matrix size as X.

E represents the Error or unmodelled residual—with the same matrix size as X.

Each factor contribution f=1,2, ... ,nFactors is defined as the outer product of two vectors:

$$X_f = t_f * p_f^T$$

where

The representation of the motion fields inside a common subspace model $p^T$ ensures that all motions modelled in the sequence belong to a common set of 'systematic motion patterns'.

Additional constraints may be added to scores $t_n$ to favour smooth temporal movements whenever possible; similarly the loadings may be smoothed to favour even spatial motion patterns. These additional constraints may be imposed after the bilinear rank reduction modelling, or included in the actual bilinear modelling.

Various aspects of the current invention for tailoring the rank-reducing model estimation method to the present needs will be described later: An aspect for integrating the rank reduction of pca and spatotemporal smoothing, and an aspect for delayed, adaptive point estimation to enhance inter-frame coordination.

The number of factors f=1,2, ... to be retained in these models may be determined as described by Joliffe (1986), Jackson (1991) or Martens & Maes 1989, mentioned above, e.g. by cross validation.

Linear Modelling

Since loading matrix subspace P represents the systematic motion patterns that have been found to be more or less valid for all the frames analyzed, it may be expected that the motion vector found in an individual frame n in the same sequence should also be well approximated a representation inside this subspace P. Its position inside the subspace P corresponds to its score vector $t_n = [t_{n1}, t_{n2}, \ldots, t_{n,nFactors}]$.

Figure 4:
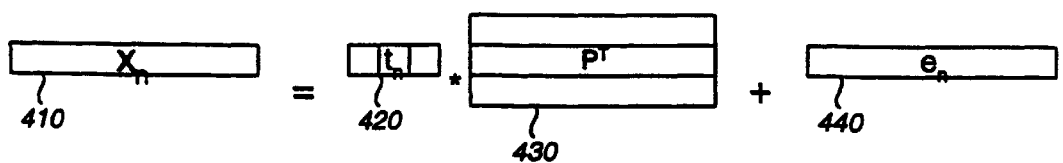
FIG. 4 illustrates the parameters from FIG. 3 pertaining to one single frame.

So, as FIG. 4 shows, the bilinear model can for an individual frame n be written:

$$x_n = t_n * P^T + e_n \quad (2)$$

where data $x_n$ is 1×nPels scores: $t_n$ is 1×nFactors loadings: $P^T$ is nfactors×npels residual: $e_n$ is 1×nPels An offset may be included in the bilinear models (confr. Martens, H. and Naes, T. (1989) Multiva rate Calibration. J.Wiley & Sons Ltd, Chichester UK),—this is for simplicity ignored in the present explaination.

Based on the motion data (e.g. stringed-out motion field estimate) for frame n, $x_n$, and on subspace loading P, the scores $t_n$ and residual vector $e_n$ can be estimated. A number of different estimation method can be employed, as long as they generally make the elements in the residual vector small. Weighted linear regression is one good method (see Weisberg S. (1985) Applied linear regression. 2nd ed., J.Wiley & Sons, New York, and Martens, H. and Naes, T. (1989) Multivariate Calibration. J.Wiley & Sons Ltd, Chichester UK): For diagonal weight matrix W the scores are then estimated by:

$$t_n = x_n * W * P * (P^T * W * P)^{-1} \quad (3)$$

One alternative to such a regression method for estimating scores, both for motion, for intensity changes and for other data domains, is nonlinear iterative optimization e.g. standard SIMPLEX optimizabon (see J.A. Nelder and R. Mead, 'A Simplex method for function minimizabon', Computer Journal 7, p. 308–313), in which from a starting value of scores successive improvements in scores are sought so as to minimize some criterion, e.g. a function of the intensity lack-of-fit between the reference image $I_R$ modified according to the scores and the frame $I_n$ to be approximated from the reference image. Combinations of the regression approach and the nonlinear iterative fitting may also be used.

Conversely, the bilinear model in equatioan (1) can also be written for each individual pixel:

$$x_{pel} = T * p_{pel} + e_{pel} \quad (4)$$

where $x_{pel}$ is nFrames×1

T is nFrames×nFactors $p_{pel}$ is nFactors×1

$e_{pel}$ is nFrames×1

Hence, in situations when data $x_{pel}$ are available for some new pixel(s) in a certain set of frames n=1,2, ... ,nFrames and the the scores T are available for these frames for a set of factors f=1,2, ... ,nFactors based on other pixels, but their loading values $p_{pel}$ are unknown for these new pixels, then these loading values can be estimated by projecting the data $x_{pel}$ on scores T, by e.g. ordinary least squares regression:

$$p_{pel} = (T^T * T)^{-1} * T^T * x_{pel} \quad (5)$$

More details will be given below in conjunction with special inventions in this regard.

When the motion fields $DA_{pel,n}$, n=1,2, ... from a set or subset of frames are defined as data X, then the loading subspace $P^T$, spanning the most significant row space of X, represents the motion information more or less common to several frames in the sequence. The score vectors $t_n$ for frames n=1,2, ... , estimated for each frame separately or for many frames jointy (see below), serve to convey this common motion information $P^T$ back to each individual frame n=1,2, ....

The parameters in a bilinear model, i.e. loading and score parameters T and P, as well as the residuals, arise from a statistical estimation process, e.g. taking the first few factors from a singular value decomposition of X. These factors ideally represent the main relevant information in X. But they also contain more or less estimation noise. A bilinear model gives better separation the lower the number of factors in the model is compared to the number of observations used for determining the bilinear model's parameters.

The uncertainty covariance of the model parameters T and P may be estimated by approximation theory. For instance, assuming residual elements in E are normal distributed $N(0, s^2)$, these uncertainties can be estimated by:

Covariance of scores: $Cov(t_n) = (P^T P)^{-1} * s^2$

Covariance of loadings: $Cov(p_{pel}) = (T^T T)^{-1} * s^2$

Covariance of reconstructed data $x_n$Hyp and of residuals $$E: Cov(t_n p_{pel}) = (h_n + h_{pel}) * s^2 \quad (6)$$

where leverage of frame $n = h_n = \text{diag}(T(T^T T)^{-1} T^T)$ leverage of pixel $pel = h_{pel} = \text{diag}(P(P^T P)^{-1} P^T)$ Alternative information about the uncertainty of the reconstructed motion fields (i.e. $x_n$Hyp) can be obtained from:

a) Residual intensity after applying the motion field: Large positive or negative intensity residual for a pel indicates invalid motion, e.g. due to occlusion problems or systematic intensity changes.

b) Slack: An estimate of the ambiguity or unreliability of a motion field may obtained by detecting how much the motion value for a pixel can be modified in different directions from its present value in $x_n$Hyp before the resulting intensity lack-of-fit increases significantly compared to an certain intensity noise level.

In estimation of scores for a new object, the scores' covariance for the different factors may be estimated from that frame's noise variance $s_n^2$: $Cov(t_n)=(P^T P)^{-1} * s_n^2$. In estimating the loadings of a new pixel, the loadings' covariance for the different factors may be estimated from the pixel's noise variance $s_{pel}^2$: $Cov(p_{pel)=(T}{}^T T)*s_{pel}{}^2$. The variances involved may be based on a priori knowledge or estimated from the data themselves after suitable correction against overfitting, as e.g. described by Martens, H. and Naes, T. (1989) Multivariate Calibration. J.Wiley & Sons Ltd, Chichester UK.

In some applications, certain known variation patterns are expected or suspected a priori to occur. Parameters describing such a priori variation patterns may be included in the modelling, thereby eliminating the need for estimating the corresponding parameters from the data themselves. If known spatial variation patterns are available, they may be included in the loading matrix P, as factors for which only scores need to be estimated. If known temporal variation patterns are available, they may be included in score matrix T, as factors for which only loadings need to be estimated. If both their spatial and temporal parameters are known, they can be included in the bilinear loading and score model without any parameter estimation.

Choice of Motion Estimator

The motion estimator should preferably be of some sort of estimation type that is able to make use of the $x_n$Hyp information and its associated hypothesis impact measures. In the motion estimation of $DA_{Rn}=x_n$, the advantage of good fit between the Reference image $I_R$ and the present image $I_n$ must be balanced against the advantage of good agreement with the other frame's motion estimates, as conveyed by the bilinear $x_n$Hyp,—as well as against fit to other hypotheses, e.g. about temporal and spatial smoothness. An example of such a motion estimator is given in WO095/26539 Method and apparatus for estimating motion, which is hereby included by reference.

The motion estimator is preferably based on mapping the lack-of-fit for each pixel position in $I_R$ to $I_n$ w.r.t various alternative motions around some expected motion field used as offset from the pixel position in $I_R$. For each pixel position in $I_R$ various input hypotheses to the motion estimator are used for making the motion estimation less underdetermined: The empirical lack-of-fit for the different alternative motions are shrunk towards zero in those areas where the motions are expected according to the hypotheses. Subsequent spatial smoothing is applied to the shrunk lack-of-fit data in order to favour continous motion fields, and the minimum of this smoothed shrunk lack-of-fit is taken for each pixel in $I_R$ as its preliminary motion estimate. This motion estimate is further filtered and modified according to depth/occlusion analysis, resulting in the motion estimates $DA_{Rn}$, which for the bilinear matrix algebra is also termed $x_n$.

Alternatively, the motion estimator may be based on phase-correlation to detect the main motion types, followed by an interpretation procedure that ascribe the different motions detected to the different parts of the picture; the hypotheses may be used both to modify the phase-correlation map (e.g. adding extra correlation where $x_n$Hyp has validity) and the subsequent interpretation phase (putting a premium on motions where the phase correlation motions and the hypotheses agree).

Other motion estimators may also be used.

Application of Bilinear Modelling in Conjunction with Motion Estimation

XHat represents the subspace approximation of X, in the sense that both the scores T and the loadings P have nFactors column vectors that span an nFactors dimensional subspace. The T subspace describes the main variations and covarations between the frames involved, and the P subspace describes the corresponding main variations and covariations between the variables (pixels) involved.

Estimation Methods for Bilinear and Linear Modelling

Bilinear Modelling (BLM)

There are a number methods for extracting the most salient subspace from a matrix X, as described by Martens & Naes 1989, mentioned above as well as in Jolliffe, I. T. (1986) Principal Component Analysis. Springer Series in Statistics, Springer-Verlag New York, and in Jackson, J. E. (1991) A User's guide to principal components. J. Wiley & Sons, Inc. New York. Common to them is that they extract the major covariation patterns in X into XHat with as few factors as possible, leaving the more or less unsystematic or unique variances in residual E. Principal component analysis (pca) or statistically truncated singular value decomposition (eliminating small singular value structures) can be used in the context of the present invention.

PLS regression may be used if external information is available, to which the motion estimation should be coordinated. One example of this to use sound information (e.g. energy at different frequency channels or from different filters) for the frames as Y variables, and use the motion data as X variables as described here. Another example is to use time shifted motion data as Y variables.

Vertical and horizontal motion may be modelled in a coordinated way, if so desired, by the use of two-block bilinear modelling, e.g. by PLS2 regression, (Martens, H. and Naes, T. (1989) Multivariate Calibration. J. Wiley & Sons Ltd, Chichester UK.)

If motion is estimated for more than one objects (holons), then the bilinear modelling of the motion data may be coordinated by the use of some N-way linear method (hierarchical multi-block bilinear method or bilinear consensus method), such as Consensus PCA (Geladi, P., Martens, H., Martens, M., Kalvenes, S. and Esbensen, K. (1988) Multivariate comparison of laboratory measurements. Proceedings, Symposium in Applied Statistics, Copenhagen Jan. 25–27, 1988, Uni-C, Copenhagen Danmark, pp 15–30.) $t_f$ is a column vector with one element for each frame. Each element $t_{nf}$ describes how this factor f manifests itself in frame n. Vector $t_f$ is here called the score vector, and its values may be positive, null or negative.

Vector $p_f^T$ (the transpose of vector $p_f$) is a row vector with one element for each variable analyzed (e.g. for each pixel). Each element $p_{fk}$ describes how this factor f manifests itself for variable k. Vector $p_f$ is here called the loading vector of factor f. Its values may be negative, null or positive. A restriction on the vector length of $t_f$ or on $p_f$ is usually imposed to avoid affine algebraic ambiguities, e.g. that the sum of the squared elements in $t_n$ should be 1.

The full factor model can then be written or on matrix form, illustrated in FIG. 3:

$$x = \sum_{f=1}^{nFactors} t_f * p_f^T + E \quad (1)$$

$$x = T * P^T + E$$

where $T=[t_f, f=1,2, \ldots, nFactors]$ is the matrix of scores for the bilinear factors,—it has one row for each frame modelled and one column for each bilinear factor modelled, $f=1,2, \ldots, nFactors$.

$P^T=[p_f, f=1,2, \ldots, nFactors]^T$ is the matrix of loadings for the bilinear facors,—it has one column for each pixel variable to be modelled simultanelusly and one row for each bilinear factor model $f=1,2, \ldots, nFactors$. The superscript $^T$ means 'transposed'.

The factor contribution matrix product $T*P^T$ can be expressed as an approximation of data matrix X and is hence termed matrix XHat:

X=XHat+E

The bilinear modelling tools described above are in the present invention used for three different purposes:

1) Improvement of motion estimation for the individual frame
2) Motion modelling for a sequence of frames
3) Enhancement of motion estimation by multi-domain modelling Each of these will now be briefly outlined below.

1) Improvement of Motion Estimation for the Individual Frame

For motion estimation for an individual frame in a sequence of related frames, the bilinear models based on other frames in the sequence are employed in order to improve the estimated motion field DAn for the individual frame. This may entail a bilinear definition of a start point (offset) for the search process, as well as a statistical modification of the motion estimation through the use of motion hypotheses.

The use of the bilinear model hypotheses is controlled so that reliable model information is used strongly, while less reliable model information is used only weakly or not at all.

The offset and the hypotheses may be defined prior to the motion estimation, or updated iteratively during the motion estimation. This will be described in more detail below.

Lack of fit residual between reliable motion field data $DA_n$ and the bilinear model is used for detecting pixels that do not fit to the bilinear model—either because they represent a new motion pattern not yet modelled, or because of errors in the data or in the bilinear model available.

Generation of Hypothesis Based on the Bilinear Subspace Model

The way information from other frames is conveyed to an individual frame n during motion estimation is in the shape of a bilinear prediction hypothesis $x_n$Hyp:

$$x_n\text{Hyp}=t_n*P^T \quad (7)$$

or, for individual pixel in frame n:

$$x_{n,pel}\text{Hyp}=t_n*p_{pel}$$

The loadings P have been estimated from motion data for other frames relative to a common reference image. The scores $t_n$ for frame n are at first estimated by temporal forecast from other frames; if the bilinear modelling is used iteratively in the motion estimation, new scores may be obtained by modelling preliminary estimate $x_n$ in terms of loadings P as described above. With the hypothesis are also the corresponding covariances $\text{Cov}(t_n p_{pel})$ or other reliability statistics estimated for each pixel, e.g. as described above.

This bilinear hypothesis may be used in two different ways:

a) To save cpu and memory, as an offset or start point for the time- and memory demanding search process of motion estimation
b) To improve precision and inter-frame coordination: An a priori statistical expectation, used e.g. for modifying the intensity differences to favour this result within the noise level of the data.

The bilinear subspace hypothesis $x_n$Hyp, may in the present invention be used for stabilization and coordination of the motion estimation for the corresponding frames, provided that the motion estimator used in the system is of a type that can utilize such offsets and additional statistical distribution expectation hypotheses. The main effect of this can be summarized as:

Without the bilinear hypotheses $x_n$Hyp to connect the motion of the different frames, the full motion field estimation for pixels relative to an individual frame n is normally highly underdetermined: There may be several alternative motions with good fit, i.e. that appear equally probable, and may thus, by chance, give quite different motion fields for a given frame. With thermal intensity noise in the input frames, it is quite random which of these alternative motions is selected. This in turn makes modelling of the motion fields difficult, which in turn result in poor compression etc. In addition, without a good starting point for the search process the motion estimation can be very cpu and memory demanding.

With the use of the bilinear hypotheses $x_n$Hyp in the motion estimation process, for each pixel in each frame a motion pattern is chosen (from the set of alternative good-fit motions) that also corresponds to the systematic, reliable motions found in other frames. Also, with a good starting point for the search process the motion estimation becomes less cpu and memory demanding.

At each pixel there may be several different bilinear hypotheses, each corresponding to one given set of assumptions about the data. Other types of assumptions (e.g. smoothness for scores in time, smoothness for loadings or motion field in space) may yield yet other, additional hypotheses.

Different hypotheses may be used simultaneously in a given motion estimation.

Hypothesis Reflects the Assumed Probability Distribution of the Expected Result

Each hypothesis $x_n$Hyp for a frame represents a point estimate within the statistical probability distribution of where $x_n$ is expected to lie, judging from the available information in the subspace formed by other frames. Associated with this point estimate is preferably also some more detail about how precise and how important the hypothesis is. This is outlined in FIG. 7.

For each pixel the actual values of each such hypothesis $x_n$Hyp 710, 720 may therefore have reliability estimates associated with it, and from these a set of Hypothesis Impact Measures can be computed, later to be input to the motion estimation. The following is one practical set of descriptors for the hypothesis validity:

1) The Hypothesis Strength 750. This defines how strongly the hypothesis shall be counted, relative to the lack-of-fit of the input intensity data.

Pixels with unreliable or unsatisfactory hypothesis are given low weight and hence the hypothesis will have little or no impact on the ensuing motion estimation for this pixel.

2) The Hypothesis Shift Range 730. This defines how the hypothesis for each individual pixel shall give credit also to alternative motions that are different, although similar to motion $x_n$Hyp.

3) The Hypothesis Propagation Range 740. This defines how this hypothesis should affect the motion estimation of nearby pixels.

2) Motion Modelling for a Sequence of Frames

The second, and quite related, usage of bilinear modelling of motion fields concerns how to improve the modelling of motion patterns: By extracting the major eigenstructures or related dominant factor structures from motion fields from several related frames, given the same reference image coordinate system, the signal/noise ratio of the results can be greatly enhanced.

For a set of related frames' estimated motion fields, $DA_{Rn}, n=1,2,\ldots,$nFrames, extract the motion patterns common to these frames by bilinear modelling of these motion estimates, in terms of the subspace spanned by a bilinear loadings $P^T$, the corresponding scores T and residuals E.

This common modelling of the estimated motion fields may be done once and for all, or iteratively. In the case of iterative modelling, the estimated motion fields may be modified by certain rules to give optimal fit to a low-dimensional common bilinear model.

Details of these alternatives are described in the preferred embodiments.

3) Enhancement of Motion Estimation by Multi-domain Modelling

During motion estimation—for an individual frame 1), or for a sequence of related frames 2), estimated changes in other domains, such as intensity, depth, transparancy or classification probability may also be modelled by bilinear approximation, in analogy to the bilinear approximation of the motion data. For instance, when there are gradual color changes in the sequence images to be submitted to motion estimation, e.g. due to changing in the lighting, these intensity changes may give errors in the motion estimation. By allowing some systematic intensity changes the sequence, the motion estimation can be made more accurate. But if too many intensity changes are allowed in the sequence, the motion estimation can be destroyed.

The multifactor linear or bilinear modelling of allowed intensity change patterns provides a flexible, yet simple enough summary of the systematic intensity changes that do not appear to be due to motion. This is particularly so, if the intensity change loadings are known or have been estimated a priori, so that the probability of erroneously modelling motion effects in the intensity domain is minimized.

Similarly, multifactor linear or bilinear modelling of depth, transparancy or classification probability can enhance the motion estimation and modelling, by correcting for systematic changes that would otherwise impede the motion estimation. But if allowed too much flexibility, adaptive correction in these alternative domains can distroy the motion estimation. Therefore such multidomain modelling must be done with restraint: only clearly valid change patterns must be included in the multidomain models. There constraints can be relaxed during iterative processes as the bilinear models become less and less uncertain.

The use of bilinear multidomain modelling in conjunction with motion estimation is described in more detail in the Fifth and Sixth Preferred Embodiments.

Preferred Embodiments

The stabilization of the motion estimation and simplification of the motion field modelling can now be done in the various ways for a given holon (or for the whole frame) in a set of related frames.

Figure 5:
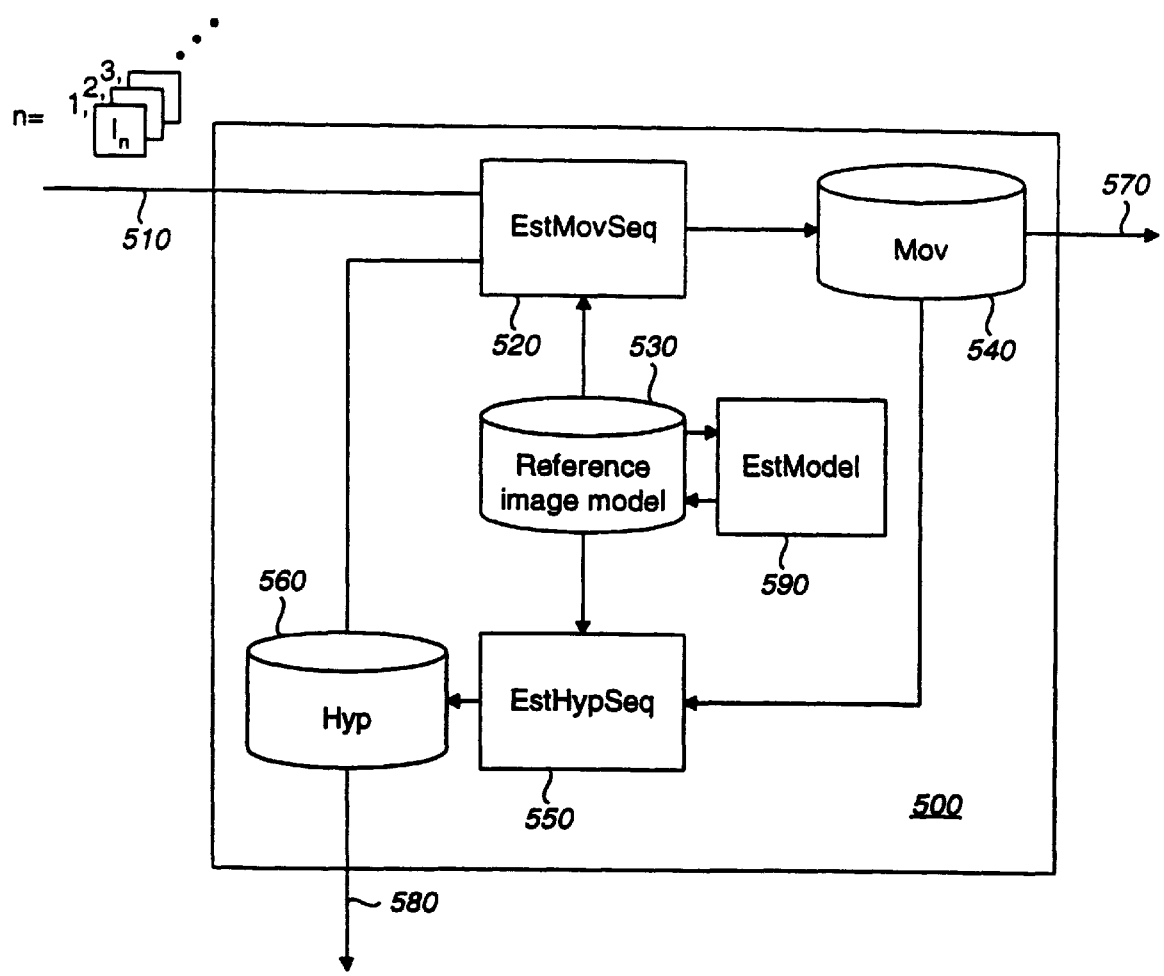
FIG. 5 shows the first preferred embodiment, in which the whole sequence or sequence of frames is treated jointly with respect to motion estimation (in block EstMovSeq), model estimation (in block EstModel) and hypothesis generation (in block EstHypSeq).

A first embodiment of the present invention for multiframe coordination of motion estimation is described in FIG. 5. It consists of iterating between 1) Estimating the motion fields $DA_{Rn}$ for all the frames n=1,2,3, . . . (relative to a reference frame R), and 2) Estimating the subspace and the hypothesis for all the frames.

Figure 6:
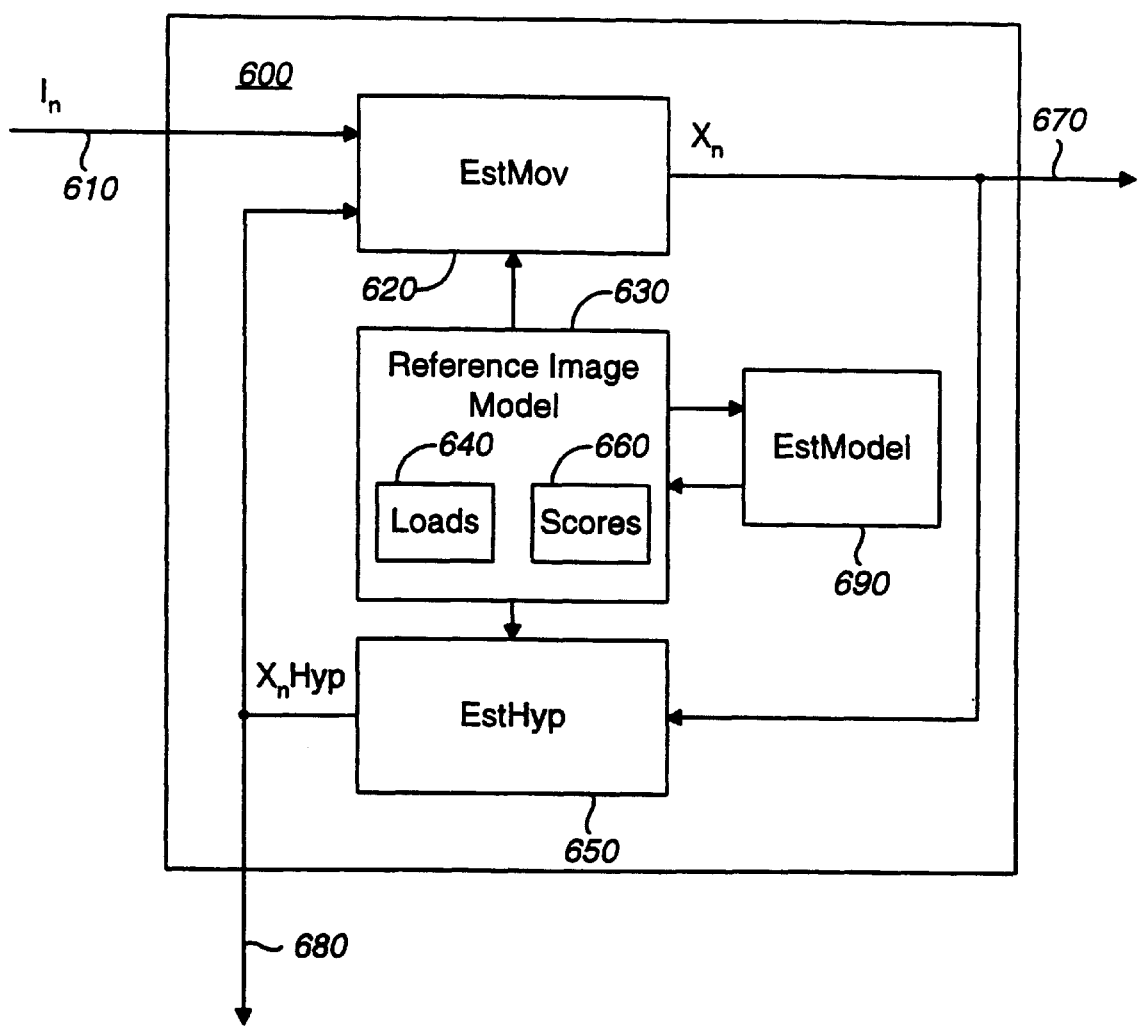
FIG. 6 shows the block diagramme for the part of the second preferred embodiment that concern the iterative combination of motion estimation (in block EstMov) moder updating (in block EstModel) and hypothesis estimation (in block EstHyp).
Figure 7:
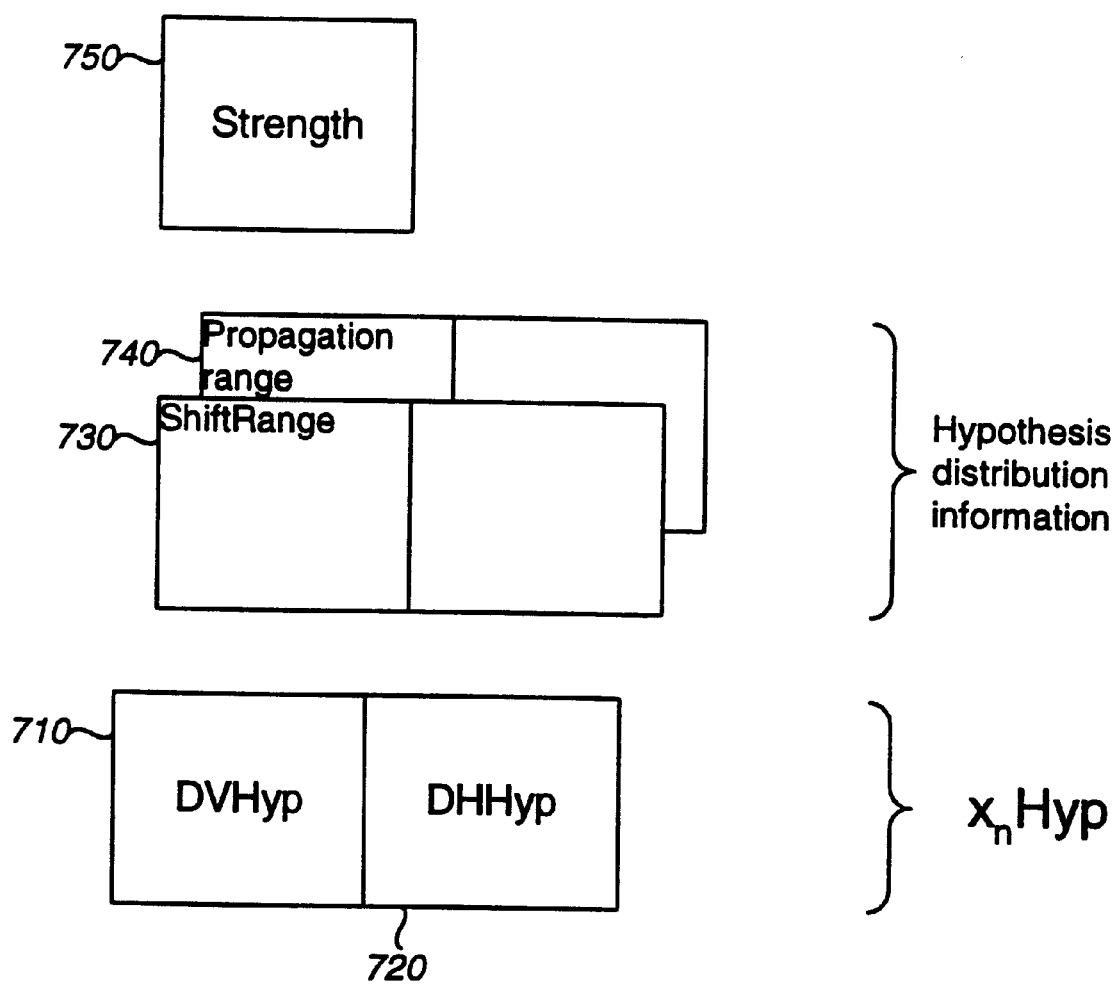
FIG. 7 shows the data structure for an input hypothesis to the motion estimator for some frame n.

A second embodiment with more detail is illustrated in FIGS. 6 and 7. It consists of using, for any frame at any stage in the iterative estimation process, whatever subspace information available at this stage, for the stabilization of the motion estimation for individual frames, and then updating/downdating the subspace estimate with the obtained individual motion estimates.

A third embodiment employs a bilinear modelling tool that includes spatiotemporal smoothing as additional optimization criterion integrated into the estimation of the bilinear parameters. It operates on a given set of input data and a given set of statistical weights for rows and columns in these data.

A fourth embodiment employs a bilinear modelling tool that allows several types of additional information and assumptions to be integrated into the estimation of the bilinear parameters. It includes iterative modification of the input data as well as of the statistical weights for these data.

A fifth embodiment employs bilinear and multifactor linear modelling both in the motion domain and the intensity domain, to allow improved motion estimation on systematically intensity-corrected images.

A sixth embodiment represents a pattern recognition extension of the fifth embodiment, based on combining a priori empirically estimated bilinear models in the intensity domain (and optionally in the motion domain) with iterative pattern recognition search processes.

FIRST PREFERRED EMBODIMENT

Bilinear Modelling After Motion Estimation for Whole Sequence

FIG. 5 shows a first embodiment of an apparatus 500 according to the invention operates in its simplest form for a sequence. Based on input intensities $I_n, n=1,2,\ldots$ 510 for the individual frames (plus possible reliability information), and on a reference image model $I_R$ 530, it delivers or outputs the desired motions estimates $DA_R, n=1,2,\ldots$ at 570 and final hypotheses at 580. The apparatus 500 operates by having motion estimation done in a block 520 EstMovSeq for the whole sequence and hypotheses make in a block 550

EstHypSeq, with intermediate results stored in blocks 540 and 560, respectively. EstMovSeq 520 estimates the motion fields, based on intensities $I_n, n=1,2, \ldots$ for the frames involved, and on the bilinear model information stored as part of the Reference Image Model, and using whatever hypothesis information 560 is available. EstModel 590 estimates the bilinear model subspaces of the motion (and possibly that of systematic intensity changes as well), and updates the bilinear model information in Reference Image Model 530 with this. EstHypSeq 550 forecasts the hypotheses for each frame based on the new bilinear model information in the Reference Image Model 530 and on the output 540 from the EstMovSeq 520.

The algorithm can be written as follows:

Divide the sequence into shorter, more homogenous sequences, if necessary.

One known method is to calculate a histogram of intensity or color distribution for each frame in the sequence, calculate a measure of similarity between histograms for pairs of frames, and assuming that when the similarity of histograms between pairs of frames is small then there is probably a scene shift. This method will catch some scene shifts, but not all.

Define one or more holon's reference image $I_R$, e.g. a certain frame in the subsequence, a certain segment of a certain frame in the sequence, or an accumulated composite segment from several images.

SUMMARY

For each homogenous sequence and holon:
While sequence estimate not converged
  Form hypotheses of the motion field for all frames in EstHypseq 550
  Estimate motion field for all frames in EstMovseq 520
  Estimate the bilinear motion model subspace in EstModel 590
  Check convergence for the sequence
End of while sequence estimate not converged
The first preferred embodiment in more detail will now be described in more detail:
While sequence estimate not converged
  Form hypotheses of the motion field for all frames in EstHypseq 550
  Renew hypothesis of the motion field estimate $x_n$Hyp for each frame in EstHypSeq 550 from equation (7). Additional hypotheses may also be formulated (e.g. by temporal interpolation/extrapolation), but their discussion will for simplicity be postponed to the second preferred embodiment.

Assess also the uncertainty of this estimate, and determine the hypothesis distributional reliability parameters, including estimated depth/folding and occlusions from other holons. Frames that generally fit well to the general subspace model P without themselves having influenced the subspace definition very much (low frame leverage in T) are given high general hypothesis strength,—other frames are given lower strengths. Pixels with good fit to the subspace model without being very influential in the score estimation (low variable leverage in P) are given relatively high strength compared to the other pixels. Pixels for which the estimated uncertainty variance of the hypothesis is low are given relatively high strengths. Pixels for which the hypothesis is found to give good fit to the corresponding when $x_n$Hyp is applied to the intensity data, are given relatively high strengths. Pixels that are deemed to be uncertain because they are near or inside estimated intra- or inter-holon occlusions are given low weights.

The hypothesis ranges are defined such that early in iterative processes, before subspace P is well defined, the shift range and propagation range are generally set relative large. As the estimation process proceeds and P becomes more well defined, the ranges are generally reduced. The hypothesis shift range for individual pixels is set such that for pixels with satisfactory, but imprecise hypothesis the hypothesis is regarded as more or less applicable over a wider range of motions than for pixels with precise hypothesis. The hypothesis propagation range is set such that pixels with very clear hypothesis are allowed to affect the hypothesis of other pixels, e.g. in the neighborhood, if they have more unclear hypotheses.

Estimate motion field for all frames in EstMovseq 520

Estimate the motion fields $x_n = DA_{R_n}$ from the reference frame $I_R$ to each of the frames $I_n, n=1,2, \ldots$ ,nFrames in EstMovSeq 520, based on the available information: $I_n$, $I_R$ (or some transformation of $I_R$, preferably with known inverse) and their uncertainties. In addition, the motion estimation is stabilized by the use of various hypotheses $x_n$Hyp, e.g. based on previously estimated bilinear loadings, and the hypotheses' distributional parameters such as hypothesis strength, hypothesis range and hypothesis propagation range, plus estimate of intra-holon depth/folding and occlusions from other holons.

Estimate the bilinear motion model subspace in EstModel 590

Estimate the scores and loadings of the motion subspace in EstModel 590 by bilinear modelling of motion data $X=(x_n, n=1,2, \ldots,$ nFrames), e.g. singular value decomposition or weighted nonlinear iterative least squares (Nipals) modelling according to eq. 1, or by a bilinear estimator that includes spatiotemporal smoothing (see third preferred embodiment) and/or iterative Optimal Scaling (see fourth preferred embodiment).

The estimation yields loadings P and scores T and residuals E. Determine the statistically optimal number of factors in P and T, e.g. by cross validation (preferably a low number). Optionally, make similar bilinear modelling of residual intensity variations moved to the reference position.

When motion data for a given frame and onwards do not allow good reconstruction, and/or when the motion data X cannot be well reconstructed from the corresponding scores and loadings, then it may be assumed that a scene shift has occured, and the current subsequence should be divided into two different subsequences where modelling should be done for each separately.

Check convergence for the sequence
End of while sequence estimate not converged

In summary, in the first preferred embodiment each pass though the sequence consists of first estimating hypotheses all the frames in EstHypSeq 550, then estimating motion for all the frames in EstMovSeq 520, and estimating/updating the model for the holon in EstModel (590) using all the new information simultaneously.

SECOND PREFERRED EMBODIMENT

Updating the Bilinear Model After Motion Estimation for Each Frame

In the second preferred embodiment, the bilinear model is updated after the motion estimation for each frame instead of after all the frames have been through motion estimation. This is described in FIG. 6.

Again, it is applied for a subsequence of related frames, and for a holon which may represent a full frame or a segment.

In order to optimize the coordination the motion estimation between the frames in sequence, the system passes one or more times through the sequence. For each pass it iterates through the frames involved. In order to optimize the motion estimation for each frame the system iteratively coordinates the estimation of motion (EstMov) with the reestimation of hypothesis (EstHyp). While not converged for a frame, the Reference Image Model is kept more or less constant. Once this has converged for a frame, the obtained motion field for this frame is used in EstModel to update the bilinear Reference Image Model in EstModel.

The algorithm summarized in FIG. 6 can be described as follows:

```
Estimate motion in sequence (600):
    While sequence estimate not converged
        For frame n = 1:nFrames   (630)
            From input image data (610) and available model infor-
                mation(630), estimate motion (670) and update the
                model (630):
        While frame iterations not converged
            Form hypotheses of the motion field x_nHyp in EstHyp
                (650):
            Estimate motion field x_n for the frame in EstMov (620)
            Check convergence for the iterations for this frame
        End  while frame iterations not converged.
            Estimate the bilinear motion model subspace  (630)  in
                EstModel (690)
        End for frame n = 1:nFrames   (630)
            Check convergence for the sequence
    End of while sequence estimate not converged
```

The second preferred embodiment, in more detail, consists of the following steps:

```
Estimate motion in sequence (600):
While sequence estimate not converged
For frame n = 1:nFrames   (630)
    From input image data (610) and available  mode
        information (630), estimate motion (670) and update
        the model (630):
    While frame iterations not converged
        Form hypotheses of the motion field x_nHyp in EstHyp
            (650):
```

Several hypotheses can be formed, depending on the available information:

Temporal forecast: If scores $t_{Rm}, m=1,2,\ldots$ are avaliable from previous and/or later frames, from other spatial resolutions or from previous sequence iterations, and smooth temporal motions are expected, then attempt to make a temporal forecast from these, using linear prediction, e.g.:

$$t_n\text{Hyp}_1 = b_0 + b_1 * t_{n-1} + b_2 * t_{n-2} + \ldots$$

$$x_n\text{Hyp}_1 = t_n\text{Hyp}_1 * P^T$$

so that the predicted value expresses the stationarity inside the time series extracted by linear regression of the data on the model.

The statistical uncertainty covariance of this hypothesis may also be estimated, based on the estimated uncertainties of the scores from the time series modelling, and propagated through the loadings:

$$\text{Cov}(x_n\text{Hyp}_1) = P * \text{Cov}(t_n\text{Hyp}_1) * P^T$$

where $\text{Cov}(t_n\text{Hyp}_1)$ is some standard statistical estimate of the covariance of the temporal forecast.

Optionally, estimate local depth field of the holon for this frame, e.g. by trial and error. Estimate also the intensity lack-of-fit obtained when applying this forecasted motion to the reference image model.

Bilinear fit: If a motion field $x_n$ has already been estimated in a previous iteration (with its estimation uncertainty measures, estimated depth field and alternative motions, and the associated intensity lack-of-fit estimates), then estimate scores by ordinary least squares regression:

$$t_n\text{Hyp}_2 = x_n * P * (P^T * P)^{-1}$$

or by some weighted or reweighted version of this.

Estimate also the corresponding uncertainty covariance $$\text{Cov}(t_n\text{Hyp}_2) = (P^T * P)^{-1} * s_x^2$$

where $s_x^2$ is the estimated uncertainty variance of $x_n$. Additional covariance may be added due to estimated uncertainty of the loadings P.

As described here, the change information $x_n$ is represented e.g. as motion field $DA_{Rn}$ in the reference position, so that it is compatible with the bilinear loadings P alsoe represented in the reference position. Alternatively, the change information may be represented in the position of the pixels in frame n, e.g. the reverse motion field $DA_{nR}$, and projected on a compatible version of the loadings P, i.e. P temporarily moved the that same position using motion field $DA_{Rn}$.

Optimal correspondence between the motion field information for frame n and the model information from the other frames in the sequence can be obtained by an iterative reweighting scheme. Outlier pixels can be detected and downweighted locally by using an iterative reweighting scheme, to reduce the effect of occlusions etc on the estimation of the scores.

An integration of linear modelling and smoothness assumptions is described in the third preferred embodiment. A rule-based algorithm for a reweighting scheme that also involves modification of the input data to the linear modelling is described in the fourth preferred embodiment.

Available information about the expected dynamics of the motions in the sequence analyzed can be applied to modify the obtained score estimate $t_n$ with respect to temporal smoothness.

Once the scores $t_n\text{Hyp}_2 = t_n$ has been estimated, then generate hypothesis $x_n\text{Hyp}_2$, e.g.

$$x_n\text{HYP}_2 = t_n\text{Hyp}_2 * P^T$$

Generate also a simplified estimate of the statistical probability distribution of this hypothesis point estimate, as outlined in FIG. 7, resulting in Hypothesis Impact Measures: Pixels with particularly high pixel leverage, $\text{diag}(P(P^TP)^{-1}P^T)$ and/or frame leverage, $\text{diag}(T(T^TT)^{-1}T^T)$, and/or abnormal bilinear residuals E or decoding intensity errors DI, are given higher uncertainty that the other pixels. These uncertainties form the basis for computing the various Hypothesis Impact Measures which define how the point estimate $x_n\text{HYP}_2$ is applied in subsequent motion estimation. In the preferred embodiment, the higher uncertainty of a pixel in a hypothesis, the lower is its strength 750 and the smaller is its Shift Range 730 and Propagation Range 740.

Hypotheses based on other principles may also be estimated at this stage, and used in analogy to $x_n\text{Hyp}_1$ in the subsequent motion estimation.

Yet other hypothesis principles may be based on the assessing the spatial derivative of the motion field $x_n$ and its uncertainties:

Precision dominance filtering $x_n\text{Hyp}_3$: Modify $x_n$ so that at each pixel in $x_n\text{Hyp}_3$ for each property (e.g. vertical and horizontal) is a weighted average of other pixels that are deemed to have relevant information; this serves to let precise motion estimates from easily identifiable picture elements from some parts of the image replace or at least influence the more uncertain motion estimates for less easily identifyable picture elements at other parts of the image. The relevance of one pel with respect to influencing the motion estimate of another pel is a function of the distance between these pels. This distance is computed in two ways,—in the image space where vertical and horizontal distance is counted, and/or in the factor loading space P where similarity in loadings is counted. This results in $x_n\text{Hyp}_3$ at each pel being a weighted average of its own $x_n$ values and the $x_n$ values of other pels. The associated uncertainty of $x_n\text{Hyp}_3$ is accordingly computed as weighted average of the uncertainties of the corresponding pels in $x_n$.

Success dominance filtering $x_n\text{Hyp}_4$: At pels for which no good motions have been found (as judged by the fit between the reconstructed and the actual input image $I_n$), the motion estimate may be replaced by motion estimates from other relevant pels with more successful motion estimates, in analogy to the precision dominance filtering above; the uncertainties are defined accordingly. Uncertain ties are propagated accordingly.

Physically improbable motion filtering $x_n\text{Hyp}_5$: Image parts where $x_n$ appears to be physically improbable are corrected. One such case is that if the spatial derivative of the motion field for some pels is higher than 1, then this will result in folding if the same motion pattern is amplified. If alternative motions at these pels can be found with about the same motion fit, these alternative motions are inserted in $x_n\text{Hyp}_5$. Uncertainties are based on the probability of the different physical assumptions and their fit to the data $x_n$.

Predictions from Other Spatial Coordinate Systems
$x_n\text{Hyp}_6$

Motion field estimates may be obtained at different coordinate representation, e.g. a different spatial resolution, and transformed into the coordinate representation presently employed. Such alternative estimates may also be used as hypotheses, so that the probability of finding motion estimates that satisfy the different coordinate representations is increased. Uncertainties in the other coordinate representations are transformed with the motion field data.

Estimate motion field $x_n$ for the frame in EstMov (620)

Estimate the motion field $x_n = DA_{Rn}$ from the reference frame to frame n, based on the available information: Intensifies $I_n$ and $I_R$ (or some transformation of $I_R$ with known inverse) and their uncertainties, various hypotheses $x_n\text{Hyp}$ and their impact measures, etc. When occlusions between segments (objects, holons) occurs, this should be corrected for in the motion estimation.

The estimation should yield a simplified statistical description of how the probability density function varies with the motion field $x_n$.

Typically, the output should contain a point estimate $x_n$ with values for each coordinate involved (e.g. vertical, horizontal, depth). However, it could possibly have more than one such point estimates.

The point estimate(s) $x_n$ should have uncertainty 'standard deviation' estimates. This may be based on statistical reliability information (estimation precision, sensitivity to noise in the input data) as well as validity information (indicating if the obtained motion estimate seems applicable or not).

A reliability estimate of the estimation motion field(s) is the 'slack' or standard deviation from motion field $x_n$ that seems to arise if random noise of a certain standard deviation is added to the intensities $I_R$ or $I_n$ from which the motion field was estimated. There could be several such slack uncertainties of each pel in $x_n$,—left and right for horizontal uncertainty, upwards and downwards for the vertical uncertainty, and forward and backward for the depth uncertainty. Uncertainties may also be given in other dimension directions, and for two or more assumed intensity noise levels.

A validity estimate of the estimated motion field(s) is that the worse intensity fit motion field estimate for a given pixel $x_{n,pel}$ delivers upon decoding, the more uncertain is it that this motion field estimate is correct. Another validity estimate is that pixels in $I_R$ that seem to be invisible in $I_n$ probably have uncertain motion estimates.

Check convergence for the iterations for this frame
End while frame iterations not converged.
Estimate the bilinear motion model subspace (630) in EstModel (690)

This bilinear modelling of the motion data (and optionally, intensity data) can be done in a variety of ways. The analysis may be performed anew on the motion estimates of a set of frames including the present frame n, $X=[x_m, m=\ldots, n, \ldots]$, e.g. by weighted QR or singular value decomposition of $X^T$.

Updating Bilinear Models

Alternatively, it may be performed by incremental updating, e.g. weighted adaptive QR-algorithm based singular value decomposition, or by weighted Nipals principal component analysis (conf. Martens, H. and Naes, T. (1989) Multivariate Calibration. J. Wiley & Sons Ltd, Chichester UK.). The effect $x_n$ of a new frame n may be added to an old model in this way:

$$x = \begin{bmatrix} P_{old}^T \\ x_n \end{bmatrix}$$

If frame n already has contributed to the previous model, $P_{old}$, then only the difference in $x_n$ ($x_n$-$x_n$, previous) is used in this updating.

X can be modelled as follows:

$$X = USV^T + E$$

where matrices U, S and V are computed by singular value decomposition of X, and the residual matrix E contains the non-significant dimensions of X (as judged e.g. by cross validation over pixels).

Then the new loadings are $$P_{new} = VST$$

and the updated scores are estimated from:

$$T_{new} = \begin{bmatrix} T_{old} & 0 \\ 0 & 1 \end{bmatrix} U$$

The estimation process for P (and T, implicitly or explicitly) in its basic form has as goal to describe as much variance/covariance in the (weighted) change data X as possible (eigenvalue decomposition). But in order to save computation time, this process does not have to iterate till full convergence.

However, this estimation process for P and T may also take into account additional information and additional requirements.

An integration of bilinear modelling and smoothness assumptions is described in the Third Preferred Embodiment A rule-based algorithm for a reweighting scheme that also involves modification of the input data to the bilinear modelling is described in the Fourth Preferred Embodiment.

End for frame n=1:nFrames

Check convergence for the sequence

If the changes in motion estimates X, motion model $TP^T$ or lack-of-fit to $I_n$ n=1,2, . . . ,N are below a certain limit, or max iterations has been reached, then end the sequence iteration.

End of while sequence estimate not converged

This algorithm is applied for the whole frame, or, if segmentation and depth estimation is involved, repeated for each spatial segment (holon).

The block diagram in FIG. 6 gives details on this iterative balancing between motion estimation and hypothesis estimation for an individual frame. The balancing operator 600 takes as input the intensity of a frame, $I_n$ 610 and the available Reference image model 630 from which the motion fields are to be estimated. This model includes the reference image intensity $I_R$ as well as whatever subspace loadings or loads P 640 and other frames' estimated scores T 660, and their associated uncertainty statistics that are available. It delivers motion estimates for this frame at 670, and hypotheses for this frame at 680 as well as an updated version of the Reference Image Model 630.

The EstHyp operator 650 initially generates hypotheses for the motion estimation, e.g. by temporal extrapolation/interpolation of results from other frames.

The EstMov operator 620 estimates the motion field $x_n$ from Reference image $I_R$ to $I_n$ using whatever hypotheses $x_n$Hyp available.

As long as the iteration for this frame has not converged, the EstModel module 690 estimates new scores by modelling the obtained data $x_n$ in terms of loadings P. When the iteration for this frame has converged or otherwise is stopped, EstModel 690 also updates the loadings P.

During the iterative process, the EstHyp operator 650 generates new hypotheses for the repeated motion estimation, e.g. fitting the preliminary motion estimate $x_n$ to the available subspace loading P to estimate scores $t_n$ and generating one hypothesis this way.

In addition, EstHyp 650 may refine the initial forms forecasting hypothesis by refined time series modelling in score T space. Other hypotheses bases on smoothness etc. (as described above) may also be formed in EstHyp 650. The result in hypotheses $x_n$Hyp are passed back to EstMov 620 for renewed motion estimation.

Figure 8:
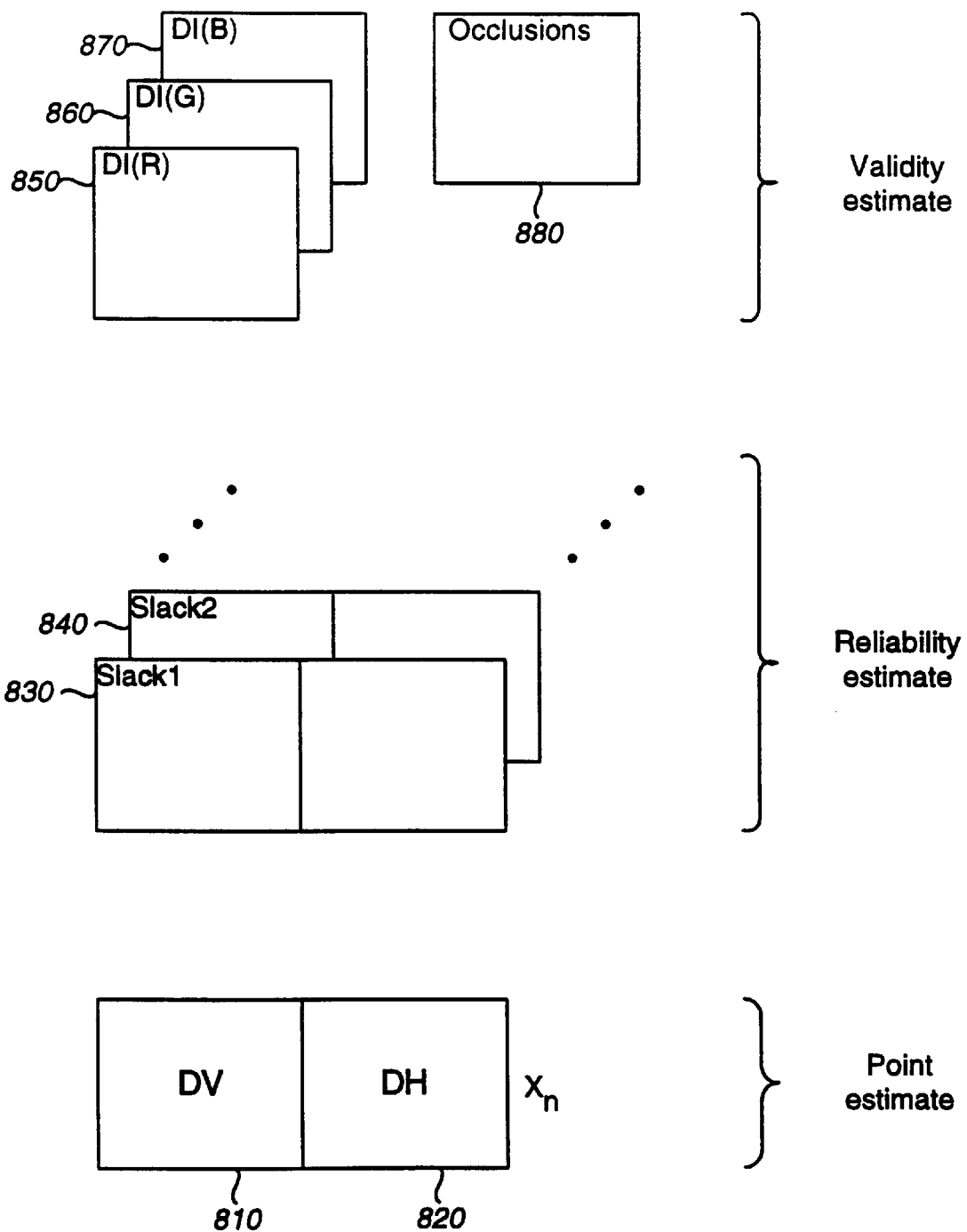
FIG. 8 shows the data structure of the output from the motion estimator for some frames n, with respect to point estimates for the hypothesis and the various hypothesis impact measures reflecting its expected statistical properties.

FIG. 8 outlines the preferred data structure of the output 680 from the EstHyp 650 for one frame. It includes the point estimates, consisting of vertical 810 and horizontal 820 motion estimate DVHyp and DHHyp and optionally also motion in the depth direction. For each of these directions the distribution information for this hypothesis includes a Hypothesis Shift Range 830 and Propagation Range 840, as well as a general Hypothesis Strength 850.

Figure 9:
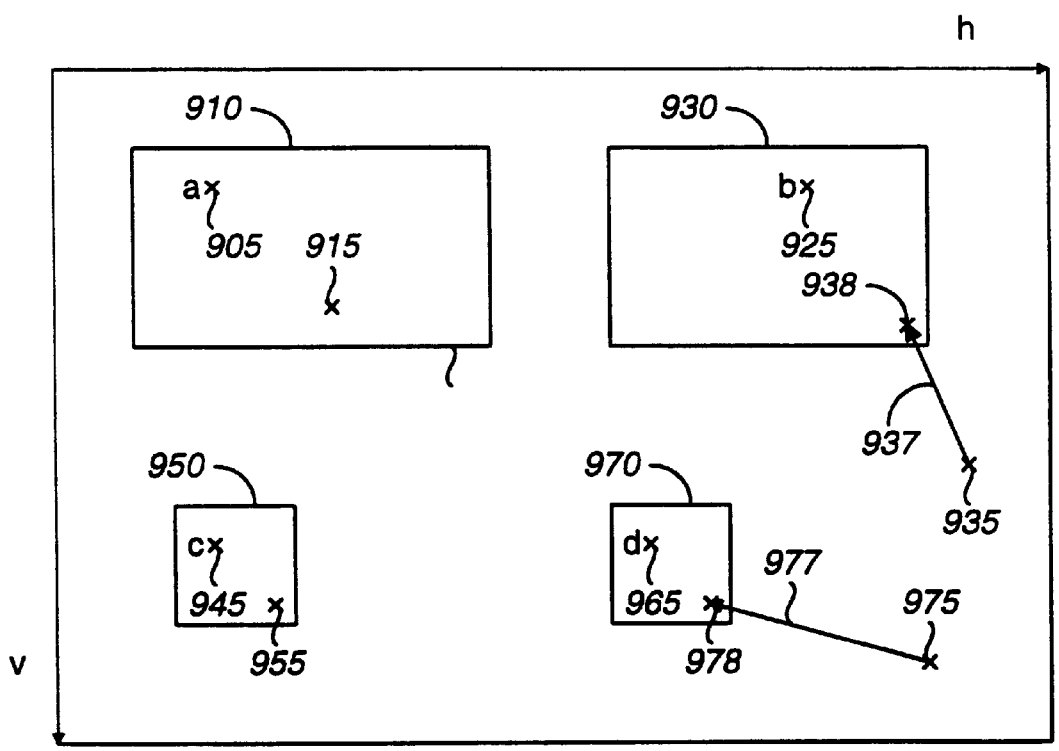
FIG. 9 illustrates the rule-based handling of slack information in the iterative version of the EstHyp operator, with respect to point estimates of the motion and its reliability information reflecting estimates of its statistical properties, in which the motion field for a given frame is modified pixel by pixel according to how the field fits to the model representing the motion estimates of other fields.

FIG. 9 outlines the data structure 670 from the EstMov 620 operator for one frame. It consists of the horizontal 910 and vertical 920 motion estimates $DV_{Rn}$ and $DH_{Rn}$ (and optionally a depth change estimate). In addition, it may optionally consist of statistical uncertainty information from the motion estimator EstMov 620. The reliability of the motion estimates is repesented by the sensitivity in the respective motion directions for intensity noise (slack). The validity of the motion estimates is represented as the lack of fit in the intensities resulting when the motion estimate is used for decoding $I_R$ (or a transform of it, conf. above). Another validity estimate is the apparent presence of occlusions.

There can be one, two or more slack parameters in the reliability information. Two slack expressions 930, 940 are shown: Up- and down-slack for vertical motion estimate and left and right slack for the horizontal motion estimated. Each of these may represent estimates of how far off from given point estimate DV and DH the motion estimate could have come if the intensity of $I_n$ were changed randomly by a certain noise standard deviation. Hence they can be seen as estimated asymetric standard deviations of the motion estimate.

The validity information includes intensity lack-of-fit 950,960,970 for whatever color space dimensions is desired—the example gives this for R,G,B color space.

In summary, the second preferred embodiment uses whatever bilinear sequence model information is available for a given frame at a given stage of the sequence encoding, for iteratively to enhance the motion estimation for that frame. But care is taken so that only model information with low apparent uncertainty is used in this enhancement, in order to avoid that estimation errors that invariably will be present in the bilinear sequence models, especially early in the encoding process when the model is only based on few previous frames, are propagated at the expense of information in the given frame's data. The bilinear sequence model information is then updated after the motion estimation for the frame. The updated version of the model is in turn used for enhancing the motion estimation of the next frame, etc. This process is performed once for the series of frames in the sequence or repeated several times for the sequence.

THIRD PREFERRED EMBODIMENT

Enhanced Bilinear Modelling Tools

The third preferred embodiment prepresents an enhancement of the first or second preferred embodiments, in that it utilizes a temporal smoothing as part of the linear estimation of scores and spatiotemporal smoothing in the bilinear estimation of loading and scores. In addition, it allows adaptive statistical weighting of the input data so as to enhance the statistical properties of the first few In the above linear score estimation and bilinear model estimation each frame generates one line in matrix X, and there is no concept of temporal continuity in the estimation of the scores.

Conversely, in the bilinear model estimation, each pixel generates one variable (one column in matrix X). Once the variables are defined, there is no concept of spatial neighbourhood between the variables—each pixel is treated without any regard for where they belong in the actual Reference image.

In the present invention, spatial and temporal restrictions may be included into the linear and bilinear estimation of these model parameters. The Third Preferred Embodiment builds these restrictions directly into the parameter estimations:

Temporal Smoothing of Scores for Fixed Loadings

In the definition of the forecasting hypotheses in EstHypSeq 550 (FIG. 5) and EstHyp 650 (FIG. 6), the scores are forecasted by time series modelling, e.g. an ARMA model, and with suitable conservative parameters in the time series model this ensures temporal smoothness.

In contrary, the hypotheses based on fitting data $x_n$ for frame n to existing loadings P by e.g. equation (3) makes no assumptions about temporal smoothness. In the third preferred embodiment such temporal smoothness is obtained by the following operation:

Estimate temporal extrapolation/interpolation $t_n Hyp_1$ and its covariance, $Cov(t_n Hyp_1)$ as described above. Estimate also preliminary temporary scores for the present frame, $t_n Hyp_{Premlim}$, and its uncertainty covariance, $Cov(t_n Hyp_{Premlim})$, as described above.

Modify $t_n Hyp_{Premlin}$ towards $t_n Hyp_1$ according to the probability that $t_n Hyp_{Premlim}$ statistically could have had the value $t_n Hyp_1$, as judged from their covariances, e.g. by:

$$t_n Hyp_2 = t_n Hyp_1 * w_n + t_n Hyp_{Prelimn} * (1-w_n)$$

where the weight $w_n$ is at its maximum, e.g. 0.5, when the two hypotheses for the two scores are not significantly different, and approachs 0 the more significantly they are different:

$$w_n = 0.5 * \text{probability}('t_n Hyp_{Prelim} \text{ appear to be equal } t_n Hyp_1')$$

or more formally:

$$w_n = 0.5 * (1 - \text{probability or rejecting the hypothesis } ('t_n Hyp_{Prelim} \text{ is not equal to } t_n Hyp_1'))$$

The probability is estimated in a conventional a significance test.

In this way estimation errors due to uncertainty in the data $x_n$ and bilinear loadings avalable, P, is balanced against uncertainty in the temporal forecast.

Spatio-Temporal Smoothing of Loadings and Scores in the Bilinear Modelling

In order to facilitate the spatio-temporal smoothing in the bilinear modelling, a special version of the algorithm for principal component analysis by the power method is employed.

The power method for extraction of individual factors is in some literature termed the 'NIPALS method' (see Martens, H. and Naes, T. (1989) Multivariate Calibration. J. Wiley & Sons Ltd, Chichester UK).

To estimate a new factor a from data X in the NIPALS principal component algorithm, the effects of previous factors 1,2, . . . ,f-1 are first subtracted from the data matrix. Then, in an iterative process the t scores for the new factor are estimated by projection of the each row in residual matrix X on preliminary values of its loadings p. Then the loadings p are conversely estimated by projection each column of residual matrix X on the obtained preliminary scores t. A factor scaling is performed, and the process is repeated until the desired convergence is reached.

This is normally done for each individual factor f=1,2, . . . , but it can also be done for several factors at one time, provided that the factors are orthogonalized to ensure full subspace rank of the solution.

In the present invention a smoothing step (followed by reorthogonalizabon) is be included both for the spatial loadings as well as for the temporal scores.

The preferred embodiment of the doubly smoothed NIPALS algorithm for modified principal component analysis is:

Initialization:

| | |
|---|---|
| f=0 | Factor number |
| E = $V_{frames} * X * V_{Pels}$ | Residual = Dually weighted initial matrix, | where $V_{frames}$=weight matrix for frames (lines in X), e.g. diagonal and inversely proportional to the uncertainty standard deviation of each frame. These weights may be a priori estimated on the basis of external information (e.g. slack estimation, as described above). Additional robustness is attained by recomputing the uncertainty variances on the basis of residuals from previous iterations.

$V_{els}$=weight matrix for pels (lines in X), e.g. diagonal and inversely proportional to the uncertainty standard deviation of each pixel. These may also be given a priori and further refined by reweighting.

Bilinear modelling:
While not enough factors a:
f=f+1
$w^T$=some start loading vector, taken e.g. as the line in E with highest sum of squares
While not converged:
$P^T$=smoothed version of loading $w^T$, to favour spatial continuity:
1. Estimate uncertainty variance of w, e.g.:

$$s_w^2 = (t^T * t)^{-*} s_x^2$$

where $s_x^2$=estimated uncertainty variance of data X.
Additional variance due to uncertainty in the scores t may also be added.
2. Smooth loading w, e.g. by low pass convolusion filtering, e.g.:

$$w_{smoothed} = S_{LP} w$$

where $S_{LP}$ is a Low Pass smooting matrix.
A more advanced smoothing takes tentative segmentation information as additional input, and avoids smoothing across the tentative segment borders.
3. Combine the unsmoothed and the smoothed loading:

$$p = w * v_f + w_{smoothed} * (1 - v_f)$$

where $v_f$ is a weight One embodiment is to define an individual weight for each pixel, $vf_{pel}$, so that it is at its maximum, e.g. 1.0, when the pixel's smoothed loading $w_{smoothed,pel}$ is not significanty different from its unsmoothed loading $w_{pel}$. The weight approaches 0 the more significantly $w_{smoothed,pel}$ is different from $w_{pel}$:

$$v_{f,pel} = 1 * (1 - \text{probability of rejecting the hypothesis } (w_{smoothed,pel} \text{ is not equal to } w_{pel}))$$

The probability is estimated in a conventional a standard significance test of $(w_{pel} - w_{smoothed,pel})$ vs. the pixel's estimated uncertainty standard deviation, $s_{w,pel}$.

Thus, in this implementation, the smoothing is only applied to the extent it does not statistically violate the estimation based on the input data X.

Scale $p^T$ so that $p^T p = 1$

Compute preliminary score estimates:

$u = E*p$ t = smoothed version of score vector u, to favour temporal continuity. The smoothing in the present embodiment is done in analogy to the one for the loading: it is only applied to the extent that it does not statistically violate the estimation based on the input data X.

$w^T = t^T * E$ (preliminary loading estimates)

Check convergence w.r.t change in t since last iteration
end while not converged
$q = (P^T * P)^{-1} P^T * w$ (Project w on previous loadings to ensure orthogonal loading set)
Orthogonalize this factor loading on previous factors:

$p = w - P*q$

Scale $P^T$ to a constant length so that $p^T * p = 1$
Include p in P
Estimate scores for this factor loading:

$u = E*p$ t = u or optionally a smoothed version of u.
Include t in T
Subtract the effect of this factor:

$E = E\ t*p^T$

Check if there are enough factors, e.g. by cross validation.
end while not enough factors
Deweighting:
Unweighted scores = $V_{frames}^{-1} * T$
Unweighted loadings = $P^T * V_{pels}^{-1}$
Unweighted residuals = $V_{frames}^{-*} * E * V_{pels}^{-1}$ Robust Statistical Version of this Smoothed Bilinear Modelling is Attained by the Following Reweighting Scheme:

Like the linear regression estimation of scores from known loadings, the bilinear estimation of both loadings and scores may be implemented in a robust way:

New weights $V_{frames}$, $V_{pels}$ may now be calculated from the unweighted residuals, after suitable correction for the parameters estimated, e.g. after leverage-correction (see Martens, H. and Naes, T. (1989) Multivariate Calibration. J.Wiley & Sons Ltd, Chichester UK), and the bilinear analysis may be repeated. Particular requirements may be induded, e.g. that frames that appear to have large, but unique variance, i.e. strong variation pattern not shared by any other frames in in X, may be down-weighted in order to ensure that the first few factors bring out the statistically most suitable or reliable factors.

Pyramidal Modelling

The bilinear modelling in motion estimation may be used pyramidally in space and time. One embodiment of spatial pyramidal operation is to perform this motion estimation, bilinear modelling and spatial segmentation on frames in lower resolution, in order to identify the major holons in the sequence, and then to use the scores and the spatial parameters (after suitable expansion and scalling) as preliminary, tentative input hypotheses to the same process at higher frame resolution. One embodiment of temporal pyramidal operation is to perform motion estimation, bilinear modelling and spatial segmentation first on a subset of frames, and use interpolated scores as generate tentative input hypotheses for the other frames.

Multi-Holon Modelling

In the preferred embodiments, the motion estimation and bilinear modelling may be performed on individual, already identified holons ('input holons'), or on complete, unsegmented images $I_n$. In either case, a multi-holon post processing of the obtained motion fields, bilinear models and segments is desired in order to resolve overlap between input holons.

One such post processing is based on having stored each holon with a 'halo' of neighbour pixels with uncertain holon membership,—i.e. that only tentatively can be ascribed to a holon (and thus is also temporarily stored in other holons or as separate lists of unclear pixels). In the motion estimation, such tentative halo pixels are treated specially, e.g. by being fitted for all relevant holons, and their memberships to the different holons updated according to the success of the motion estimates. Such halo holons are given very low weight or fitted passively (e.g. by Principal Component Regression, see Martens, H. and Naes, T. (1989) Multiva rate Calibration. J.Wiley & Sons Ltd, Chichester UK.) in the bilinear modelling.

Extra Variables

Additional columns in the data matrix X may be formed from 'external scores' from other blocks of data. Sources of such 'external scores' are:

scores from bilinear modelling of some other data domain,
(e.g. motion compensated intensity residuals of the same holon), or
scores from the same holon at a different spatial resolution,
scores from other holons, or
scores from external data such as sound
(e.g. after bilinear modelling of sound vibration energy spectra of these same frames).

The weights for such additional variables must be adapted so that their uncertainty level become similar to those of the weighted pixels in the final data matrix to be modelled, X.

Hierarchical Bilinear Modelling of Motion Data

An alternative way to incorporate uncertain pixels or extenal scores gently, without forcing their information into the bilinear model, is to replace the one-block bilinear modelling with a two- or more-block modelling, such as PLS regression (Martens, H. and Naes, T. (1989) Multivariate Calibration. J. Wiley & Sons Ltd, Chichester UK.) or Consensus PCA/PLS (Geladi, P., Martens, H., Martens, M., Kalvenes, S. and Esbensen, K. (1988) Multivariate comparison of laboratory measurements. Proceedings, Symposium in Applied Statistics, Copenhagen Jan. 25–27, 1998, Uni-C, Copenhagen Danmark, pp 15–30. In this way, the uncertain pixels and external scores contribute positively to the modelling if they fit well, but do not affect the modelling strongly in a negative way if they do not fit. In any way these uncertain pixels and external scores are fitted to the obtained bilinear model.

The scores from the present holon's modelling in the present resolution and in the present domain may in turn be used as 'external scores' for other holons or at other resolutions or in other domains, as shown in the Consensus PCA/PLS algorithms (Geladi, P., Martens, H., Martens, M., Kalvenes, S. and Esbensen, K. (1988) Multivariate comparison of laboratory measurements. Proceedings, Symposium in Applied Statistics, Copenhagen Jan. 25–27, 1998, Uni-C, Copenhagen Danmark, pp 15–30.)

Such hierarchical multiblock modelling may also be used for data from other domains, such as motion compensated intensity change data.

FOURTH PREFERRED EMBODIMENT

Individual Weighting and Delayed Point Estimation of Data Elements

In the linear and bilinear modelling stages described in the three first preferred embodiments the motion estimation data $X=[x_n^T, n=1,2, \ldots]$ were taken for granted as input to the statistical parameter estimation. Statistical optimization or robustification against errors in X were attained in the Third Preferred Embodiment by a) including additional restrictions (spatotemporal smoothing) and/or b) including weighting and reweighing for the rows and columns of X. But the data elements in X were not weighted individually. Nor were the the actual values in X themselves affected during the modelling process.

In some cases there is a need to alter the impact of individual data elements in X for frame n, pixel pel: $x_{n,pel}$. For instance may some data elements be known or believed a priori to be particularly uncertain, either due to occlusions, or because they give rise to very large individual outlier residuals in E, $e_{frame,pel}$, in preliminary linear or bilinear modelling, or because they display abnormally high individual intensity errors upon decoding.

The fourth preferred embodiment can then either apply individual down-weighting, rule-based modification of the data values, or combinations of these for such particulary questionable data elements in X. Collectively, these techniques are here termed 'Opbmal Scaling'.

More generally speaking, the fourth preferred embodiment can be used in conjunction with the three previous preferred embodiments, and makes them more compatible with the over-all goals of the invention: The improved motion estimation and the improve motion modelling by the coordination of motion estimation for several frames via bilinear models.

Motion estimation is usually an underdetermined process. Therefore motion ambiguities will unavoidably result in estimation errors in the point estimates (estimated values) for motion estimates $da_{R_n}$ early on in an estimation process. These errors will only manifest themselves later in the sequence, and by then it may be too late: The early errors have already been brought into the bilinear model, which later has been used in order to minimize the motion ambiguity in subsequent frames. Therefore these early errors may be propagated in an undesired way and be an unnecessary hindrance to effective inter-frame coordination of motion estimation. Typically, the number of required bilinear factors required for adequate modelling of the motion data becomes too high.

In the fourth preferred embodiment, this problem is solved by down-weighing of individual uncertain data, and/or by the technique of 'Delayed point estimation'. The motion field for each frame n=1,2, . . . nFrames is estimated and stored, not only with respect to its seemingly 'best' value (its point estimate) $x_{n,pel}$, but also with respect to other statististical properties. These statistical properties are then used to ensure maximum inter-frame coordination as motion data for more and more frames become available: The weight and/or the value of individual point estimates $x_{n,pel}$ with particular uncertainty or particular ambiguity are modified.

Weighing of Individual Data Elements

One way to alter the impact of individual data elements is to ascribe special weights to them in the linear regressions to estimate scores or loadings. In this way data elements assessed to be particularly unreliable are given weights lower than that expected from the product of row weights and column weights, i.e. they are treated more or less as missing values. Conversely, data elements judged to be particularly informative may be given higher weights.

For the regression of a frame's motion field on known loadings to estimate the frame's scores, and for the regression of a pixel's motions on known scores to estimate the pixel's loadings, this works very well. For single-factor bilinear modelling it can also work well.

However, such internal detailed weighting violates the geometric assumptions behind the known bilinear estimation algorithms. Therefore, when more than one factor is to be expected in X, it may lead to convergence problems in the bilinear modelling, and to unexpected and undesired parameter values.

Several alternative ways to reduce the detrimental effect of outliers and missing values may be used instead of the down-weighing method above, as described e.g. in Nonlinear Multivariate Analysis, Albert Gifi (1990), J. Wiley & Sons Ltd. Chichester UK.

An alternative version of the fourth preferred embodiment modifies the actual values themselves, instead of just the statistical weights, of individual data elements $x_{n,pel}$ in input matrix X (the estimatimated motions).

Modification of the Value of Individual Data Elements

When the uncertainty range can be estimated, the fourth preferred embodiment also modifies the values of individual data elements so that they correspond better to the values from other pixels and other frames, as judged from linear or bilinear modelling. An important feature of the rules governing this modification is that the data are only allowed to be changed within their own uncertainty range. Thereby the information content of the input data is not violated, yet an improved inter-frame and inter-pixel coordination is attained.

The higher the uncertainty of an input point estimate $x_{n,pel}$ is deemed to be, the more is its value allowed to be influenced from the information in other, more certain points. The influence comes via linear or bilinear model reconstructions.

As described in FIG. 8, the uncertainty range of the data elements is constructed from two types of measures: validity (is the obtained point estimate $x_{n,pel}$ relevant?) and reliability (how precise is the value of the point estimate $x_{n,pel}$ ?).

The validity of a pixel's estimated motion in a frame n is preferably estimated from A) the size of its intensity lack-of-fit error upon decoding (850, 860, 870), as well as B) an assessment of the probability that it does not represented occluded, invisible objects (880). A pixel whose intensity in the reference image does not correspond at all with the intensity of the pixel it is assumed to move to in the frame n, is considered highly invalid w.r.t its preliminary motion point estimate $x_{n,pel}$. This motion point estimate should therefore not be allowed to have impact on the bilinear modelling, and may instead be modified to adhere more closely to the motion patterns found on the basis of more valid data points. Likewise, a pixel that represents a segment in the reference image that appears to be hidden behind another segment in frame n, is also considered invalid and treated accordingly.

The reliability of a pixel's estimated motion in a frame n is preferably estimated from:
   a) Slack estimation: estimation of how much the preliminary motion estimate may be changed before it has unacceptable consequences for the decoding of the image (830, 840), and
   b) Lack of fit to bilinear model in earlier iterations in the linear or bilinear modelling.

This handling of individual data elements may be used both in the linear and bilinear modelling. For example, using this principle, the pseude-code of the second preferred embodiment would be modified as follows (detailed explanations are given later):

```
Estimate motion in sequence (600):
While sequence estimate not covered (1000)
   For frame n = 1:nFrames
      From input image data (610) and available model
         information (630), estimate motion (670) and update
         the model (630):
         Form start hypotheses of the motion field xnHyp in
            EstHyp (650)
      While frame iterations not converged
         Estimate motion field xn for the frame in EstMov (620)
      Modify the estimated motion for frame n: (1005)
      While rule-based regression iteration not converged (1010)
         Determine uncertainty of pixels in xn based on validity
            and reliability estimation (1020)
         Determine regression weights for pixels based on
            uncertainty of xn (1030)
         Estimate scores tn by weighted regression of xn on
            loadings PT (1040)
         Reconstruct motion field xnHat = tn*P' (1050)
         Modify values xn=f( xnHat, uncertainty of xn) (1060)
         Check convergence of rule-based regression iteration: Is
            tn stabile? (1070)
      End While rule-based regression iteration
      Form hypotheses of the motion field xnHyp in EstHyp (650)
         Check convergence for the iterations for this frame
      End while frame iterations not converged.
      Estimate the bilinear motion model subspace (630) in
         EstModel (690):
      Modify the estimated motions for many frames: (1100)
      While rule-based bilinear x-modelling iteration has not
         converged (1110)
         Determine uncertainty of each elements xi, pel,i=1,2,...,n
            in x (1120)
         Determine least squares wieght for frames, pels and
            individual data elements in x (1130)
         Estimate scores T and loadings P (incl. rank) from
            weighted bilinear modelling of x (1140)
         Reconstruct motion field matrix XHat=T*PT (1150)
         Modify values X=f(XHat, uncertainty of X) (1160)
         Check convergence for the rule-based bilinear x-
            modelling: Is T stabile? (1170)
      End while rule-based bilinear modelling iteration
   End for frame n = 1:nFrames
      Check convergence for the sequence
End of while sequence estimate not converged
```

An implementation of slack information structure was illustrated in FIG. 8. Slack may be assessed in various directions; in the following example it has been assessed horizontally and vertically.

FIG. 9 illustrates one simple, but effective use of slack information for four pixels: The pixel points a 905, b 925, c 945 and d 965 represent the position of the pixels after having been moved with the preliminary point estimates $x_a$, $x_b$, $x_c$, $x_d$, respectively. The rectangles 910, 930, 950 and 970 around the pixels represent the areas within which the motions $x_a$, $x_b$, $x_c$, $x_d$ may be changed without generating significant intensity errors, e.g. intensity errors relative to the frame to be reconstructed, $I_n$ that could not have arisen randomly due to thermal noise in $I_n$.

FIG. 9 shows that the motion estimate for pixels a 905 has very asymetric uncertainty ranges, as represented by the rectangular slack range 910: While motions further upwards or further to the left would give bad fit for this pel, motions may be modified downwards and especially far to the right without causing bad intensity fit. Such effect could arise e.g. when the frame to be reconstructed, $I_n$ has a steep intensity gradient just above and to the left of position a, while being very flat below and to the right of position a. Therefore e.g. the preliminary horizontal motion point estimate $dh_{n,a}$ may be altered to the right, but not to the left, and preliminary vertical motion point estimate $dv_{n,a}$ may be altered downwards but not upwards in the figure. Accordingly, the motion estimate for pixel a 905 might have been changed to point 915 without causing significant intensity errors. Pixel b likewise has large and assymetric uncertainty range. Still, the motion estimate for pixel b 925 cannot be changed to point 935 without violating the estimated motion information for this pixel.

The small rectangle 950 around pixel c 945 shows that for this pixel the preliminary motion point estimate cannot be changed much in any direction before an unacceptably high intensity lack-of-fit would be found. This could be the case because the intensity of the frame to be constructed, $I_n$, has steep gradients in all directions from point b. Still, the motion estimate for pixel b 945 may be changed to point 955 without causing significant intensity errors. Pixel d likewise has narrow uncertainty range. Its motion cannot be changed from its estimate 965 to point 975 without violating the estimated motion information 970 for this pixel d.

This uncertainty range information may be used for delayed point estimation—i.e. for changing the values of preliminary point estimates $x_n$ to ensure increased comparability of motion data for several frames within the ambiguity of the individual motion estimates.

The rule based 'Optimal Scaling' technique can be applied at different stages during the motion estimation to optimize the compatibility: 1) within the motion estimation for a frame (steps under 1000), and 2) within the remodelling of the sequence motion model (steps under 1100).

Modifying the estimated motion for frame n (1005):

In case 1) $x_n$ is regressed on the subspace loading matrix P spanning the apparent systematic variations of other frames. The projection of $x_n$ on P (step 1040) for this frame results in certain factor scores $t_n$. These in turn generate the bilinear reconstruction $x_n Hat = t_n * P^T$ (step 1050), used iteratively (step 1060) as input to a renenewed motion estimation for this frame. In FIG. 9, if a pixel's bilinear recontruction value in $x_n$Hat falls inside its acceptable range (for example at points 915 and 955), the hypothesis value can be regarded as being as good as the original $x_n$, value for this pixel, and are therefore inserted into $x_n$.

On the other hand, if the bilinear reconstruction value $x_n$Hat falls outside the acceptable range around the motion estimation value, then the bilinear reconstruction value cannot be used. This is illustrated by points 935 and 975. In such cases one may then either keep the motion estimates in $x_n$ unmodified (here: 925 and 965) as the best estimates, or replace the elements in $x_n$ by the value that is closest to the bilinear reconstructions but lying inside the acceptable range (938 and 978). In some cases the motion estimate for a pixel in frame n (e.g. 905, 925, 945 or 965) is expected to be particularly uncertain e.g. because of a validity problem: it seems to reflect an object rendered invisible by occlusion in frame n. In such cases the modified value of $x_{n,pel}$ may be allowed to be closer to the bilinaer reconstruction $x_{n,pel}$Hat, even though this reconstruction falls outside the apparent reliability range (e.g. changing pixel d from value 965 to a value close to 975).

Repeated Regression on Modified Motion Vectors

Errors in the motion vector $x_n$ cause errors in the scores $t_n$ obtained by regressing $x_n$ on loadings P. After the above modification increases the fit of $x_n$ to subspace P, a renewed regression (1040) may be expected to give new scores $t_n$ with lower errors. Thus, the score estimates $t_n$ may now be refined by again projecting the modified motion vector $x_n$ on the loadings P, the rule based modification of the motion data again applied, and this iterative regression process repeated for as long as is desired. In each new score estimation, new weights for the pixels may be used. One implementation of this is to weigh down those pixels more or less inversely proportional to their distance $DIST_{n,pel}$ to the acceptable range (937, 977), e.g. $weight_{n,pel}=1/(1+DIST_{n,pel})$.

Repeated Motion Estimation with Improved Hypotheses

After convergence of the above regression iteration, the modified values of $x_n$ are inserted into hypothesis $x_n$Hyp (step 1050), which is then supplied for a renewed motion estimation for this frame (step 650), and this iterative motion estimation process is repeated for as long as is desired.

The final motion estimation $x_n$, then represents a different result than the initial motion estimate $x_n$ for this frame, and the modifications give better coordination with the motion estimate information from other frames, without significant loss of intensity correctness for frame n itself. If the results in FIG. 9 represented this final motion estimation iteration for pixels a, b, c, and d, then their motion estimates (905, 925, 945, 965) might be replaced by values (915, 938, 955, 978).

Modify the estimated motions for many frames (step 1110):

The algorithm for the fourth preferred embodiment above shows how a similar rule-based modification of the motion data can be applied during the estimation of the loading subspace P. In an inner iteration for improved bilinear modelling, the sequence motion data to be modelled, X, are modified in step 1160 according to previously estimated bilinear reconstructions XHat (step 1150), to ensure better internal coordination within the uncertainty ranges, and the bilinear model is then updated.

In an outer iteration for modelling the whole sequence (step 1000), motion hypotheses based on bilinear motion model is used for enhancing the motion estimation for the frames, and the obtained motion estimates are used for updating the bilinear sequence model. In conjunction with the first preferred embodiment, this outer iteration is done each time the whole sequence of frames has been analyzed for motion. In the Second Preferred Embodiment it is preferably done progressively, each time a new frame has been motion analyzed.

Other Modelling Methods

The rank-reducing bilinear modelling was above applied to the two-way frames x pels system. It may be extended into a three-way or higher-way linear system by assuming a linear time series model for the scores or a linear spatial forecasting model for the loadings, or a linear factor analytic model for the color channels. This can give improved motion stabilization as well as improved over-all compression. Alternatively, bilinear methods that seek to combine bilinear structures from more holons, more image resolutions etc. may also be used. The Consensus PCA NPLS (Geladi, P., Martens, H., Martens, M., Kalvenes, S. and Esbensen, K. (1988) Multivariate comparison of laboratory measurements. Proceedings, Symposium in Applied Statistics, Copenhagen Jan. 25–27, 1998, Uni-C, Copenhagen Danmark, pp 15–30) is one such alternative.

Other modelling methods than the additive bilinear modelling may be used, for instance mixed additive-multiplicative modelling. One such alternative, which may be used e.g. as preprocessing prior to bilinear modelling, is Multiplicative Signal Correction (MSC) and its extensions, as described in Martens, H. and Naes, T. (1989) Multvariate Calibration. J. Wiley & Sons Ltd, Chichester UK.

The Use of Pseudofactors

When good a priori loadings are known, these may be used instead of or in addition to the loadings estimated as described above. In particular, the loadings corresponding to affine motions may be used.

FIFTH PREFERRED EMBODIMENT

Combined Motion Modelling and Intensity Modelling

In the present context, motion estimation between two frames that contain the same objects, say the reference frame R and frame n, concerns comparing the intensities of two frames, $I_n$ vs $I_R$, under various assumptions about where in frame n the objects from frame R have moved to. However, if the an object's intensity itself changes between frame R and frame n, and this intensity change is not corrected for, then these intensity changes may mistakenly be treated as motions, and an inefficient modelling may be the result.

Conversely, the estimation and modelling of intensity changes in the present context consists of comparing intensities of the reference image with the intensity of frame n. If an object in frame n has moved relative to its position in the reference frame, and this motion is not compensated for, it may mistakenly be treated as intensity change, and an inefficient modelling may again be the result.

The present embodiment employs bilinear modelling in the motion domain and/or in the intensity change domain to minimize such mistakes.

In the first version of the embodiment, motion estimation is improved by bilinear intensity change modelling: It assumes that one has established a bilinear intensity change model (consisting of intensity scores and loadings), e.g. based on prior know edge or by PCA of the intensities $I_n$ of a set of frames where the light intensity of the objects change, but the objects do not move relative to the reference image. The first version consists of the following steps:

For each frame in the sequence
1. Estimate the frame's intensity change scores
   (e.g. by extrapolation/interpolation from the intensity scores of other frames)
2. Compute the intensity change $DI_{Rn}$ for this frame as the product of its intensity change scores and the intensity change loading matrix 3. Generate for this frame an intensity corrected reference frame as $$C_R = I_R + DI_{Rn}$$

4. Estimate the motion field $DA_{Rn}$ from $C_R$ to $I_n$, e.g. by one of the methods described in this report.

In the second version of the embodiment, intensity change estimation is improved by bilinear motion modelling: It assumes that one has established a bilinear motion model (consisting of motion scores and loadings), e.g. based on prior knowledge or by PCA of the motion fields $DA_{Rn}$ of a set of frames where the objects move, but the light intensity of the objects do not change relative to the reference image. The second version consists of the following steps:

For each frame in the sequence
1. Estimate the frame's motion scores
   (e.g. by extrapolation/interpolation from the motion scores of other frames)
2. Compute the motion field $DA_{Rn}$ for this frame as the product of its motion scores and the loading matrix
3. Use the motion field $DA_{Rn}$ to generate the motion corrected intensity change, e.g. by moving (warping) $I_n$ back to the reference position:

$$Jn = MoveBack(I_n \text{ using } DA_{Rn})$$

4. Estimate intensity change at the reference position:

$$DI_{Rn} = J_n - I_R$$

In the third version of this embodiment, the first and the second version are combined sequentially: It assumes that one has established a bilinear intensity change model (consisting of intensity scores and loadings), e.g. based on prior knowledge or by PCA of the intensities $I_n$ of a set of frames where the light intensity of the objects change, but the objects do not move relative to the reference image. The third version consists of the following steps:
1. Estimate motion fields $DA_{Rn}$ for one or more frames according to the first version, using the bilinear intensity change model.
2. Estimate or update a bilinear motion model from these motion fields.
3. Estimate intensity change fields $DI_{Rn}$ for one or more frames according to the second version, using the obtained bilinear motion model.

In the fourth version of this embodiment, the second and the first version are combined sequentially: It assumes that one has established a bilinear motion model (consisting of motion scores and loadings), e.g. based on prior knowledge or by PCA of the motion fields $DA_{Rn}$ of a set of frames where the objects move, but the light intensity of the objects do not change relative to the reference image. The fourth version consists of the following steps:
1. Estimate intensity change fields $DI_{Rn}$ for one or more frames according to the second version, using the bilinear motion model.
2. Estimate or update a bilinear intensity change model from these intensity change fields.
3. Estimate motion fields $DA_{Rn}$ for one or more frames according to the first version, using the obtained bilinear intensity change model.

The fifth version of this embodiment consists of iterating between the first and second version of the embodiment, with an updating of the bilinear models in between. The starting step can be chosen to be version 1 or version 2. In this example, version 1 is the starting step. A prior bilinear intensity change model is then established e.g. as described above, and the fifth version consists of the following steps:
1. Estimate motion fields $DA_{Rn}$ for one or more frames according to the first version, using the bilinear intensity change model.
2. Estimate or update a bilinear motion model from these motion fields.
3. Estimate intensity change fields $DI_{Rn}$ for one or more frames according to the second version, using the bilinear motion model.
4. Estimate or update a bilinear intensity change model from these intensity change fields.
5. Check convergence: e.g. are the motion scores stabile?
6. Repeat steps 1–5 until convergence The sixth version of this embodiment is similar to the fifth. But bilinear models are assumed to exist both for intensity change and for motion, and their loadings are not updated inside this version. The sixth version consists of the following steps:
1. Estimate motion fields $DA_{Rn}$ for one or more frames according to the first version, using the bilinear intensity change model.
2. Estimate intensity change fields $DI_{Rn}$ for one or more frames according to the second version, using the bilinear motion model.
3. Check convergence: e.g. are the motion scores stabile?
4. Repeat steps 1–3 until convergence.

After the first iteration in the iterative versions 5 and 6, the intensity change scores may be estimated by regressing the estimated motion compensated intensity change field $DI_{Rn}$ on the intensity change loading matrix. Likewise, the motion scores may after the first iteration be estimated by relating the estimated motion field $DA_{Rn}$ to the motion loading matrix, either by regression or by nonlinear iterative minimization. In the latter case, the criterion to be minimized may be a function of the residual intensity error after subtraction of the estimated effect of the bilinear intensity change model from the motion compensated intensity change field $DI_{Rn}$. Additional constraints may be included in the criterion, e.g. in order to guard against meaningless solutions such as motion fields reducing the motion compensated $DI_{Rn}$ to abnormally few pixels in the reference image.

Constraints in the corrections: For optimal efficiency, this embodiment may be operated with certain constraints on the motion estimates and the intensity change estimates. In the fifth version of the embodiment these constraints may be increasingly relaxed as the iterations proceed.

On one hand, the constraints on the intensity corrections in the motion estimation may be such that only intensity correction that does not appear to reflect unmodelled motion, or otherwise does not introduce artifacts in the motion estimation, is applied. This means that, particularly early in the iterative process, bilinear intensity change information that does not have large scores for more than one frame or a small group of adjacent frames is scaled towards zero, and/or the intensity corrections are smoothed spatially.

On the other hand, the constraints on the motion compensations in the intensity change estimation are such that only motions that do not give unexpected folding effects are allowed; this means that particularly in the beginning of the iterative process, the motion compensation fields are smoothed to avoid folding unless clear indications for valid occlusions are established.

The methods described above for the present embodiment may be applied in a pyramidal fashion. One example of this is that the prior bilinear models have been estimated at a different spatial resolution and just scaled to correct for the resolution differences.

The said methods, like all the other methods presented here, may be applied repeatedly for a given sequence of frames.

Simultaneous dual domain change estimation and modelling: On one hand motion estimation and bilinear multi-frame motion modelling is performed on the basis of intensity corrected images. On the other hand intensity change estimation and bilinear multi-frame intensity modelling is performed on the basis of motion compensated image intensities.

Resiproke domain corrections based on the bilinear models: One one hand, the intensity correction used in the motion estimation is based on the best available bilinear intensity model, but subjected to additional constraints. On the other, the motion fields used for the address correction (motion compensation) in the intensity change estimation iteration are based on the best available bilinear motion model, but subject to additional constraints.

Constraints in the corrections: On one hand, the constraints on the intensity corrections, to be used in the motion estimation, are such that only intensity correction that does not appear to reflect unmodelled motion or edge interpolation effects, is applied. This means that, particularly early in the iterative process, bilinear intensity change information that does not have large scores for more than one frame or a small group of adjacent frames, is scaled towards zero, and/or these intensity corrections are smoothed spatially. On the other hand, the constraints on the motion compensations, to be used in the intensity change estimation, are such that only motions that do not give unexpected folding effects are allowed. This means that particularly in the beginning of the iterative process, the motion compensation fields are smoothed to avoid folding unless clear indications for valid occlusions are established.

Downweighting uncertain information in the modelling: In the bilinear modelling, pixels and pixel regions that are detected to have particularly high uncertainty, e.g. due to apparent occlusions or edge effects, are weighted down relative to the other pixels. Likewise, particularly uncertain frames are weighted down. Particularly uncertain single observations for certain pels for certain frames are treated more or less as missing values and modified within the bilinear estimation process to comply with the more certain observations, by the invention described in the fourth preferred embodiment.

SIXTH PREFERRED EMBODIMENT

Flexible Yet Restricted Pattern Recognition

Another application of bilinear intensity modelling combined with motion estimation is intended to allow a flexible pattern recognition with limited computational requirements:

Summary: The over-all pattern recognition goal is here to find and identify, and possibly quantify, an unknown object in an image, by searching for a match to one or more known objects. The motion estimation concerns finding where in the image the unknown object is. The role of the bilinear intensity model is to allow each known object to represent a whole class of related objects. (A bilinear motion model for each object may also be used). The obtained parameters of the bilinear models in the end provides detailed qualitative and quantitative information about the found object.

Application using affine motion estimation: Systematic variations in the pattern of an object to be searched for is first approximated by bilinear modelling in the intensity domain, based on a set of known images of the objects. Then, in order to find this object in an unknown image, this model is applied repeatedly at different positions. This allow automatic correction for known systematic variations without loss of too many degrees of freedom and without too much computational requirements.

Example of e.g. a face:

Calibration: A number of images of different faces are recorded in order to estimate a Reference model.

Calibration motion compensation: The images may optionally have been normalized by affine transformations so as to give maximal overlap of eyes, nose, mouth etc. More details on such motion compensation is given in the fifth preferred embodiment, as well as in WO95/08240 Method and apparatus for data analysis, which is hereby included by reference.

Calibration intensity modelling: The intensity in black&white or in various color channels are then approximated by bilinear intensity modelling. This intensity Reference modelling may consist of first selecting one typical face,—the 'Reference face,—it could be one given image of one given person, or some aggregate of images of several persons. Then the variations around this average Reference image may be modelled by principal component analysis, retaining only the significant intensity factors, as judged e.g. by cross validation. Presumably, the normalized faces used in this calibration have been chosen sufficiently different so as later to enable adequate predictive approximation of many other frames from the same statistical population by interpolation. Details of how to build such a bilinear Reference calibration model is given e.g. in Martens & Naes 1989, mentioned above. Additional artificially created loadings, modelling e.g. varying light conditions, may also be included in the set of intensity loadings.

Prediction: To find the unknown position of a new face from the same statistical population, the obtained calibration results are used for simultaneous motion estimation and intensity change estimation.

Prediction motion estimation: The unknown image intensity and the bilinear intensity Reference model (Reference face and intensity factor loadings) are repeatedly displaced relative to each other. This may most easily be attained by moving the unknown image to different positions and holding the more complex bilinear intensity Reference model unmoved in reference position.

Prediction intensity estimation: For each displacement, the bilinear Reference model is fitted to the corresponding image intensity to estimate the intensity scores, e.g. by some fast regression technique. Reweighted partial least squares regression may be used in order to reduce effects of outlier pixels due to e.g. sigarettes or other small unexpected abnormalities.

The (weighted) lack-of-fit residual between the image's intensity and the bilinear Reference model (in one or more color channels) are computed and assessed.

Final prediction result: The displacement that gives the smallest weighted lack-of-fit residual variance may be taken as the position of the unknown face, and the corresponding intensity scores and residuals may be taken as parameters characterizing the given unknown face.

Combined motion and intensity modelling: In order to allow the unknown face to have another size and inclination than the ones used in the bilinear modelling (after optional normalization), the prediction process may be repeated with the normalized intensity model scaled and rotated by different affine transformation scores, and the best over-all fit is search for. Thereby not only the position but also the size and inclination of the face is estimated.

Application using general motion estimation:

Optionally, a motion estimation and accompanying motion modelling may be used in the calibration phase so that not only intensity differences and coarse, affine motions are allowed, but also other types of shape differences. This may be done by bilinear modelling of motion fields or their residuals after affine transformation, resulting in motion scores and motion loadings for various factors. Additionally, extra factors spanning known typical motion patterns arising e.g. from tilting or turning the head, from smiling or laughing, may be included in the motion model: The loadings of these extra factors may have been obtained from controlled experiments involving motion estimation of the person with the Reference face, seen when tiffing or turning or talking.

The Reference model now contains two model domains: motion model and intensity change model, both pertaining to one Reference position (e.g. the average face, or one typical face). The motion model includes both the coarse, affine motion modelling and the fine bilinear motion model. This dual domain restricted bilinear modelling, which allows for certain shape variations and certain intensity variation, may be used in various search processes.

One such search process is to apply the model around various affine motions (translations, scaling, rotation) applied to the unknown image: For the affine motion perform a local motion estimation, between the moved unknown image and the Reference image or some transformation thereof within the bilinear motion and intensity change models. The obtained local motion field is regressed on the motion loadings of the Reference model, to estimate local motion scores, to estimate the systematic fine positioning and reshaping of the unknown face, within the subspace of allowed fine motions.

The intensity difference between the motion compensated input image and the Reference image is projected on the bilinear intensity loadings to estimate the intensity scores and the resulting intensity residual image and lack-of-fit variance. As above, the affine motion with the lowest lack-of-fit variance is chosen as the final one, and the corresponding bilinear scores for non-affine motions and intensity changes, as well as the resulting intensity residuals, give the characteristics of the individual unknown face. These data may e.g. be used for more detailed pattern recognition purposes.

In addition to only size and inclination correction, full face shape correction may also be included. In this case a full bilinear modelling of facial shape variations is included in this invention: During the calibration phase, systematic shape variations for the different normalized face images, relative to the referencing image, may be detected by motion estimation and summarized by linear motion modelling. Likewise, systematic intensity variations of the motion compensated face images are detected as difference images at the reference position and summarized by bilinear intensity modelling, as described in the previous embodiments. During predictive pattern recognition for a known face, the search process is supplemented with a process that estimates the scores both of the motion model and the intensity change model, using e.g. a nonlinear iterative residual minimization (J. A. Nelder and R. Mead, 'A simplex method for function minimizabon', Computer Journal, vol. 7, p. 308–313).

An unknown image may be searched using two or more such models (e.g. model of men's faces, model of womens' faces, model of children's faces), and the model that shows the best fit for a certain image region is the chosen.

Relaxation

To the extent there are iterative steps in the estimation processes in the above preferred embodiments, various control parameters may be relaxed as a function in of iteration number and model performance. Among the parameters to be relaxed are:

1) Smoothing parameter: Smoothing parameters for motion estimation may be relaxed, e.g. as describe in 'Optic Flow Computation', A. Singh, (1991), IEEE Computer Society Press, pp. 38–41, which is hereby included by reference. Early in an estimation process, a harder smoothing should be done than later in the process.

2) Pyramid impact parameter: In the case of hierarchical, multi-resolution motion estimation, the parameter that regulates the impact of results from one resolution level on the next, may be relaxed. Early in an estimation process low-resolution results may have higher impact than later in the process.

3) Intensity impact parameter: When correcting for intensity changes in multi-domain estimation and modelling, then only intensity changes that are consistent over several frames, and thereby are relatively certain to reflect genuine intensity changes and not unmodelled motion falsely treated as intensity changes, should be allowed. This can partly be achieved by letting intensity changes have little impact on the intensity correction early stage of an estimation process.

4) Segmentation sensitivity to details: Early in an estimation process, the estimated motion information and also other information, is relatively uncertain. It may therefore be suboptimal to segment based on too small spatial details, relative to their uncertainty, early in the estimation process. Most segmenting methods operating on still images have a threshold that influences how small details will be considered.

Other Applications

The above technique for coordinating motion estimation for different frames via a mathematical bilinear model is also applicable to other types of data. Examples of such data are:

Sound

Vibration Time Series

A sound frame may represent an energy vector recorded over a fixed or varying length of time, and may be given as a function of time. 'Motion estimation' is this case may detect short-term temporal shifts in the time pattern in comparison to a reference sound frame, e.g. describing velocity differences in different people's pronounciation of a word or a sentence. The bilinear modelling of the time shifts from many repeated frames (recordings) of the same word or sentence serves to generate a model of the systematic timing variations involved. Bilinear modelling of frames' time compensated energy vectors represent additional systematic intensity variations in the sound. The bilinear models may in turn be used for facilitating subsequent 'motion' estimatons of short-term temporal shifts as described for video images.

Vibration Frequency Spectra

Alternatively, the sound frames may be given e.g. as frequency spectra, after a Fourier Transform or subband/wavelet transform of the time frames recorded. In this case the 'motion estimation' may detect shifts in the frequency spectrum of each frame relative to a reference frequency spectrum, e.g. describing how the overtone series shifts systematically when a given music instrument is played at a different pitch. The bilinear modelling of the estimated frequency shifts show how the overtone series systematically moves when the pitch is changed. The bilinear modelling of the pitch corrected intensities reveals systematic intensity changes beyond the frequency shifting. The bilinear models may in turn be used for facilitating subsequent 'motion' estimation of frequency shifts.

Vibration Energy Images

To accommodate variations on different time scales, the sound frames may be recorded in more than one dimension. A two-way example similar to video images is when each frame represents the frequency spectrum of the sound energy, recorded over e.g. a millisecond (ordinate) vs. time, e.g. for 1000 milliseconds (abscissa). Motion estimation relative to a reference frame allows detection of both frequency shifts and temporal delays. Subsequent bilinear modelling of the motion over several frames detects systematic patterns in frequency and timing shifts. Bilinear modelling of the motion compensated energies detects systematic patterns in the intensities beyond the frequency and timing shifts. These bilinear models may be fed back to enhance subsequent motion estimations.

The bilinear model parameters involved (scores, loadings and residuals) for sound may be used for digital compression of audio data. They may also be used in order to give a compact model of the sound patterns, used e.g. for post-editing of the sound, in video games, etc. They may also be used for process control and for automatic error warnings, e.g. when the vibration data come from mechanical equipment such as different vibration sensors in a car, a ship or an airplane. The sound scores may be related to corresponding image information or bilinear image scores form approximately the same time frames, for further video compression, lip synchronization, etc. The bilinear modelling of the sound data may be performed jointly with the bilinear modelling of the video data, e.g. by PLS2 regression (Martens & Naes 1989) or Consensus PCA/PLS (Martens & Martens 1986, Geladi et al 1988).

Other applications of combined motion estimation and bilinear modelling are in analytical chemistry:

An application of the present invention is the coordinated estimation and modelling of systematic position changes and intensity changes over multiple observations in spectrometry. One example of this is nuclear magnetic resonance (NMR) spectroscopy and consists of estimating and modelling the so-called 'chemical shifts' (corresponding to 'motion' in the previous video coding explanation) and concentration-controlled changes in peak heights ('intensity changes') of various types of molecular functions (possible 'holons'), recorded e.g. at different frequencies ('pixels') in a set of different but related chemical samples ('sequence of frames)). Electron spin resonance (ESR) spectroscopy can be analyzed similarly.

Another type of chemical application is spectrophotometry of various sorts (e.g. transmission, reflectance, flourescence, Raman) in various electromagnetic wavelength ranges, e.g. from X-ray to radio frequency. For instance, in the ultraviolet/visible/infrared range, the application of the present invention could correspond to detecting solvent induced wavelength shifts ('motion') and concentration-controlled absorbance changes ('intensity change') of various types of molecules or molecular groups (possible 'holons'), recorded at different wavelengths, wavenumbers or time-of-flights ('pixels') in a set of different but related chemical samples ('sequence of frames').

Yet a class of applications of the present invention concerns physical separation techniques such as chromatography and electrophoresis and flow injection analysis. For instance, in high pressure liquid chromatography separation of chemical compounds, the application of the present invention could correspond to detecting retention time changes ('motion' induced by changes in the stationary phase of the column) and concentration controlled detector signal changes ('intensity changes') of various chemical compounds (possible 'holons'), recorded at different chromatographic retention times ('pixels') in a set of different but related chemical samples ('sequence of frames').

In such quantitative analysis applications the way to combine holons is generally simpler than in video coding, since the effects of overlapping holons usualizu can be added together without any regard for occlusion. Therefore the need for segmentation is less than in video coding.

Examples of other application are:

2D multi-channel color video images, ultrasound images, or satellite images, or radar image data, 2- or 3D images from computer tomography, or Magnetic Resonance Imaging, 1D line camera data.

While the invention has been particularly shown and described with reference to the preferred embodiments thereof, it will be understood by those skilled in the art that various changes in form and detail may be made therein without departing form the spirit and scope of the invention. Particularly, the term "plurality" can be interpreted in the sense of "one or more".

What is claimed is:

1. A method for estimating motion between one reference image and one or more frames in a sequence of two or more frames, each frame consisting of a plurality of pixels of an input image, comprising the steps of:

estimating motion from the reference image to two or more of the frames to produce motion fields;

transforming the motion fields into a motion matrix, where each row of the motion matrix corresponds to one motion field and each row of the motion matrix contains a vertical and a horizontal component of a motion vector pertaining to each pixel of the reference image; and performing Principal Component Analysis on the motion matrix to produce a factorization of the motion matrix into the product of a motion score matrix and a motion loading matrix, the motion score matrix comprising a plurality of motion score vectors arranged as column vectors, the motion loading matrix comprising a plurality of motion loading vectors arranged as row vectors, the factorization forming a bilinear model in which one column of said motion score matrix and one corresponding row of said motion loading matrix together comprise a factor of the bilinear model, the number of factors being lower than or equal to the number of said frames;

wherein results from the Principal Component Analysis on the motion matrix are used to influence further estimation of motion from the reference image to one or more of the frames.

2. The method according to claim 1, comprising the steps of:
   (1) estimating a particular motion field for each frame from the reference image to the respective frame
   (2) transforming the estimated motion field for each frame into a motion matrix;
   (3) performing Principle Component Analysis on the motion matrix associated with each frame;
   (4) for each frame, multiplying the entries of the motion score matrix corresponding to the frame by the corresponding motion loading vectors to produce a motion hypothesis for each frame;
   (5) for each frame, estimating a motion field from the reference image to said frame, using the motion hypothesis as side information; and
   (6) outputting the motion fields estimated in step (5), the output motion fields representing the motion between said reference image and each respective frame in the sequence of frames.

3. The method according to claim 2, wherein steps (2) to (5) are repeated for a plurality of passes through said sequence of frames.

4. The method according to claim 3, wherein said motion estimation is performed with reference to a smoothness parameter which is a decreasing function of pass number, a smoother motion field being produced for a higher value of said smoothness parameter.

5. The method according to claim 3, wherein said motion hypothesis is formed with reference to a hypothesis impact parameter which is an increasing function of pass number, a larger hypothesis impact parameter producing a motion hypothesis which has a greater impact on said motion estimation.

6. The method according to claim 2, further comprising the steps of:
   (5b) re-estimating the bilinear model based on the motion field found in step (5);
   (5c) multiplying the motion score matrix for the given frame by the motion loading vectors from the re-estimated bilinear model to produce a second motion hypothesis; and
   (5d) estimating a particular motion field from the reference image to the frame, using said second motion hypothesis as side information,
wherein the motion field estimated in step (5d) represents the motion between the reference image and the frames.

7. The method according to claim 2, wherein during the Principal Component Analysis of step (3) and the formation of the motion hypotheses in step (4) uncertainty estimates for the motion hypothesis are generated and subsequently used to control the degree of impact of the motion hypothesis as side information in the motion estimation in step (5).

8. The method of claim 2, wherein the collection of motion score vectors and motion loading vectors estimated in step (3) represents the motion fields.

9. The method according to claim 1, the method comprising the steps of:
   (1) estimating motion from the reference image to the first of said frames;
   (2) forming the motion matrix from the estimated motion between the reference image and the first of said frames;
   (3) performing Principal Component Analysis of the formed motion matrix;
   (4) for a next one of said frames, predicting a value for the motion score vectors using extrapolation from previous entries of the motion score matrix and multiplying the predicted entries of motion score vectors with the motion loading vectors to produce a motion hypothesis for each frame;
   (5) for said next frame, estimating a particular motion field from the reference image to the frame, using the motion hypothesis as side information; and
   (6) repeating steps (2) to (5) for respective subsequent next frames until no more frames remain in the sequence,
wherein the motion fields estimated in step (5) represent the motion between the reference image and the frames.

10. The method according to claim 1, comprising the steps of:
    (1) estimating motion from the reference image to the first frame in said sequence;
    (2) forming a motion row vector containing each component of the motion vector for each element of the reference image and with one row for each frame;
    (3) updating the bilinear model based on the appended new motion row vector;
    (4) for a next of said frames, predicting a value for the motion score matrix using extrapolation from previous entries of the motion score matrix and multiplying the predicted entries of the motion score matrix by the motion loading vectors to produce a motion hypothesis for each frame;
    (5) for the next frame, estimating a motion field from the reference image to the frame, using the motion hypothesis as side information; and
    (6) repeating steps (2) to (5) for respective subsequent next frames until the last frame in said sequence has been processed;
wherein the motion field estimated in step (5) represents the motion between the reference image and the frames.

11. The method of claim 10, wherein steps (2) to (6) are repeated for a plurality of passes through said sequence.

12. The method of claim 11, wherein steps (2) to (5d) are repeated for a plurality of passes through said sequence.

13. The method of claim 1, further comprising the step of using an intermediate bilinear model of the motion matrix as side information for motion analysis in higher spatial resolution, the intermediate bilinear model having motion loading vectors of reduced spatial resolution relative to the motion loading vectors of the bilinear model.

14. The method according to claim 13, wherein a degree of use of said bilinear model is indicated by a pyramid impact parameter that is a decreasing function of pass number, a large value for said pyramid impact parameter resulting in a strong influence of said side information.

15. The method according to claim 1, wherein a segment field is used to select a part of said reference image and motion estimation is performed only for the selected part of said reference image.

16. The method of estimating motion according to claim 1, wherein the reference image is part of the sequence of frames, and further comprising the step of:
    segmenting said reference image based on the estimated motion to produce a plurality of segment fields.

17. The method of claim 16, further comprising the steps of:
    estimating motion for each segment field; and
    repeating the segmenting and estimating motion for the segment field steps for a plurality of passes, the collection of estimated motion fields in the last of said passes representing segmentwise motion.

18. The method according to claim 17, wherein segmenting of said reference image is performed according to a segment detail parameter which is an increasing function of pass number, a higher value of said segment detail parameter producing a more detailed segmenting.

19. The method of claim 1, further comprising the step of performing an Optimal Scaling on the bilinear model.

20. The method of claim 1, wherein the step of performing Principal Component Analysis includes reweighting.

21. The method of claim 1, wherein the step of performing Principal Component Analysis includes the step of handling missing values in the input data which correspond to areas in said reference frame where said motion estimation was not successful for the corresponding given frame.

22. The method of claim 1, further comprising the step of preprocessing the frames to normalize intensity and position of the frames.

23. The method of claim 1, wherein said motion matrix is augmented with score matrices taken from bilinear models of supplementary data matrices for the same frames used to generate the motion matrix, said supplementary data matrices containing data from one of (a) motions for other holons, (b) intensity changes, (c) motions estimated in an earlier stage, and (d) motions estimated at another spatial resolution.

24. The method of claim 1, wherein the step of performing Principal Component Analysis comprises smoothing said motion loading vectors.

25. The method of claim 1, wherein the step of performing Principal Component Analysis comprises smoothing said motion score vectors.

26. The method of claim 1, wherein there is one motion matrix for each spatial dimension in said reference image, and each said component of each said motion vector is placed in the motion matrix that corresponds to said spatial dimension.

27. The method of claim 1, further comprising the step of approximating a specific frame from the reference image by moving the reference image according to estimated motion.

28. The method of claim 1, comprising the steps of:
selecting a specific frame;
estimating motion from the reference frame to the specific frame; and
regressing the motion found in the estimating step on the motion loading vectors to produce entries for the motion score matrix corresponding to the selected specific frame.

29. The method according to claim 1, further comprising the steps of:
(1) selecting a specific frame;
(2) initializing a set of motion score vectors to start values, the number of said motion score vectors being equal to the number of said motion loading vectors;
(3) for each of a plurality of trial score combinations, computing a motion field by multiplying said trial combination of motion score vectors by said motion loading vector, moving a second image according to said motion field to produce a reconstruction, computing a fidelity measurement according to the difference between said reconstruction and a first image, each trial score combination being computed as a perturbation of said motion scores;
(4) computing new motion scores dependent on said trial combination of motion score vectors and said fidelity measurement; and
(5) repeating steps (3) and (4);
wherein said motion load vectors and said motion score vectors computed by the last repetition of step (4) represent motion to be approximated for the selected specific frame.

30. The method according to claim 1, wherein an intensity score matrix comprises a plurality of intensity score vectors arranged in columns and an intensity loading matrix comprises intensity loading vectors arranged in rows, each intensity score vector element corresponding to one frame, each element of each intensity loading vector corresponding to one element of the reference image, one column of said intensity score matrix and one intensity loading vector together constitute a factor, the number of factors being less than or equal to the number of said frames, the sum of factors describing intensity changes in said reference image,
the step of estimating motion comprising the substep of adjusting at least one of the reference image and a specific frame according to the intensity loading vectors.

31. The method according to claim 30, further comprising the steps of:
(1) predicting intensity score entries of the intensity score vectors for said specific frame by one of interpolating and extrapolating from entries of the intensity score vectors from related frames;
(2) computing an intensity-corrected reference image from the product of intensity scores predicted in step (1) and the intensity loading vectors, plus said reference image; and
(3) estimating motion from said intensity-corrected reference image to said specific frame, the estimated motion representing motion relative to said reference image for said specific frame.

32. The method of claim 1, further comprising the steps of:
(1) computing an intensity-corrected reference image as the product of the intensity change score vector entries for a specific frame and the intensity change loading vectors, plus said reference image;
(2) estimating motion from said intensity-corrected reference image to said specific frame;
(3) projecting the motion estimated in step (2) on said motion loading vectors to produce motion scores for said specific frame;
(4) computing a motion field by multiplying the motion score vector entries produced in step (3) by the motion loading vectors;
(5) moving said specific frame backwards according to the motion field computed in step (4) to produce a motion compensated image;
(6) calculating an intensity difference between the motion compensated image produced in step (5) and said reference image;
(7) projecting the difference calculated in step (6) on the intensity change loading vectors to produce intensity change score vector entries for said specific frame; and
(8) repeating steps (1)–(7) one or more times;
wherein the specific frame is described relative to the reference image according to intensity change loading vectors, motion loading vectors, and initial intensity change score vector entries for the specific frame.

33. The method of claim 1, further comprising the steps of:
(1) initializing an intensity change model comprising intensity change score vectors and intensity change loading vectors to empty;
(2) initializing a motion model comprising motion score vectors and motion loading vectors to empty;
(3) choosing an unprocessed frame;
(4) if a non-empty intensity change model is available, predicting intensity change score vector entries for the unprocessed frame by one of interpolating and extrapolating to related frames, computing an intensity correction by multiplying the predicted intensity change score vector entries for said unprocessed frame by the intensity change loading vectors, computing an intensity-corrected reference image by adding said intensity correction to said reference image,
otherwise setting the intensity-corrected reference image to be equal to said reference image;
(5) estimating motion from said intensity-corrected reference image to said unprocessed frame;
(6) updating said motion model according to the motion estimated in step (5);
(7) computing a motion compensation field by multiplying motion score vector entries for said unprocessed frame by said motion loading vectors;
(8) moving said unprocessed frame backwards according to the motion compensation field, thereby producing a motion-compensated image;
(9) calculating the difference between said motion-compensated image and said reference image;
(10) updating said intensity model according to the difference calculated in step (9);
(11) repeating steps (3)–(10) for each frame in said sequence;
wherein the motion score vectors and motion loading vectors resulting from the last repetition of step (6) and the intensity change score vectors and intensity change loading vectors resulting from the last repetition of step (10) together represent the motion and intensity changes for the reference image relative to each frame in the sequence.

34. The method of claim 33, wherein the step of intensity modeling includes calculating uncertainties, adjusting said intensity corrections according to said uncertainties by at least one of smoothing, multiplying by, or subtracting from said intensity correction in accordance with said uncertainties.

35. The method of claim 33, wherein said intensity corrections are adjusted according to an intensity relaxation parameter which is a decreasing function of repetitions, a small intensity relaxation parameter resulting in a small intensity correction.

36. The method of claim 33, wherein the motion modeling includes the steps of calculating uncertainties and smoothing said motion compensation field according to said uncertainties.

37. The method of claim 33, wherein the motion is smoothed according to a motion relaxation parameter which is a decreasing function of repetitions, a small motion relaxation parameter resulting in little smoothing.

38. The method of claim 37, wherein steps (3)–(11) are repeated for several passes.

39. The method to claim 38, wherein after the step of moving backwards, a Multiplicative Signal Correction is performed.

40. The method according to claim 1, further comprising the steps of:
(1) initializing an intensity change model consisting of intensity change score vectors and intensity change loading vectors to empty;
(2) initializing a motion model consisting of motion score vectors and motion loading vectors to empty;
(3) choosing an unprocessed frame;
(4) if a non-empty motion model is available, predicting motion score vector entries by one of interpolating and extrapolating to related frames, computing a motion compensation field by multiplying the predicted motion score vector entries by the motion loading vectors, moving said unprocessed frame backwards using the motion compensation field thus producing a motion-compensated image,
otherwise setting the motion-compensated image to be equal to said unprocessed frame;
(5) calculating a difference between said motion-compensated image and said reference image;
(6) updating said intensity model according to the difference calculated in step (5);
(7) computing an intensity correction by multiplying the intensity change score vector entries updated in step (6) corresponding to said frame by the intensity change loading vectors updated in step (6);
(8) adding said intensity correction to said reference image to produce an intensity-corrected image;
(9) estimating motion from said intensity-corrected image to said unprocessed frame;
(10) updating the motion model with the motion estimated in step (9);
(11) repeating steps (3)–(10);
wherein the motion score vectors and motion loading vectors resulting from the last repetition of step (10) and the intensity score vectors and intensity loading vectors resulting from the last repetition of step (6) together represent the motion and intensity changes for the reference image relative to each frame in the sequence.

41. The method according to claim 1, wherein said intensity model is initialized according to a set of chosen intensity patterns.

42. An apparatus for estimating motion between one reference image and one or more frames in a sequence of two or more frames, each frame consisting of a plurality of pixels of an input image, said apparatus comprising:
means for estimating motion from the reference image to two or more of the frames to produce motion fields;
means for transforming the motion fields into a motion matrix, where each row of the motion matrix corresponds to one motion field and each row of the motion matrix contains a vertical and a horizontal component of a motion vector pertaining to each pixel of the reference image; and
means for performing Principal Component Analysis on the motion matrix to produce a factorization of the motion matrix into the product of a motion score matrix and a motion loading matrix, the motion score matrix comprising a plurality of motion score vectors arranged as column vectors, the motion loading matrix comprising a plurality of motion loading vectors arranged as row vectors, the factorization forming a bilinear model in which one column of said motion score matrix and one corresponding row of said motion loading matrix together comprise a factor of the bilinear model, the number of factors being lower than or equal to the number of said frames;

wherein results from the Principal Component Analysis on the motion matrix are used to influence further estimation of motion from the reference image to one or more of the frames.

43. A data structure stored in a computer readable medium and suitable for representing motion between one reference image and each frame in a sequence of frames, said frames consisting of a plurality of data samples arranged in a spatial pattern, said data structure comprising:

(1) a plurality of motion patterns represented as loading vectors, each element of each loading vector corresponding to one element of said reference image; and (2) a plurality of motion score vectors, each motion score vector corresponding to one of said frames, each motion score vector consisting of the same number of elements as the number of loading vectors, each motion score element of each motion score vector representing how much the corresponding loading vector should contribute to the total motion for said one frame.

* * * * *